United States Patent
Feiring et al.

(10) Patent No.: US 9,777,204 B2
(45) Date of Patent: *Oct. 3, 2017

(54) EPOXIDE AND FLUORINATED EPOXIDE STABILIZERS FOR FLUOROOLEFINS

(71) Applicant: THE CHEMOURS COMPANY FC, LLC, Wilmington, DE (US)

(72) Inventors: Andrew Edward Feiring, Wilmington, DE (US); Viacheslav A Petrov, Hockessin, DE (US); Barbara Haviland Minor, Elkton, MD (US); Mario Joseph Nappa, Newark, DE (US); Nandini C Mouli, Reisterstown, MD (US); Thomas Joseph Leck, Hockessin, DE (US); Jon Lee Howell, Bear, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/817,337

(22) Filed: Aug. 4, 2015

(65) Prior Publication Data
US 2015/0337192 A1 Nov. 26, 2015

Related U.S. Application Data

(62) Division of application No. 13/967,780, filed on Aug. 15, 2013, now Pat. No. 9,133,381, which is a division of application No. 12/377,454, filed as application No. PCT/US2007/019140 on Aug. 31, 2007, now Pat. No. 8,535,555.

(60) Provisional application No. 60/921,529, filed on Apr. 2, 2007, provisional application No. 60/841,907, filed on Sep. 1, 2006, provisional application No. 60/841,831, filed on Sep. 1, 2006.

(51) Int. Cl.
C09K 5/04 (2006.01)
F25B 39/02 (2006.01)

(52) U.S. Cl.
CPC .............. *C09K 5/045* (2013.01); *F25B 39/02* (2013.01); *C09K 2205/10* (2013.01); *C09K 2205/102* (2013.01); *C09K 2205/104* (2013.01); *C09K 2205/11* (2013.01); *C09K 2205/126* (2013.01); *C09K 2205/132* (2013.01); *C09K 2205/134* (2013.01); *C09K 2205/24* (2013.01)

(58) Field of Classification Search
CPC combination set(s) only.
See application file for complete search history.

(56) References Cited

U.S. PATENT DOCUMENTS

| | | | |
|---|---|---|---|
| 5,156,768 A | 10/1992 | Thomas et al. | |
| 5,202,044 A | 4/1993 | Hagihara et al. | |
| 5,895,793 A | 4/1999 | Kitamura et al. | |
| 6,066,768 A | 5/2000 | Nappa et al. | |
| 6,184,187 B1 | 2/2001 | Howell et al. | |
| 8,075,796 B2 | 12/2011 | Rao et al. | |
| 8,097,181 B2 * | 1/2012 | Leck | C09K 5/045 252/67 |
| 8,383,004 B2 | 2/2013 | Mouli et al. | |
| 8,394,286 B2 | 3/2013 | Leck et al. | |
| 8,529,786 B2 | 9/2013 | Leck et al. | |
| 8,535,555 B2 | 9/2013 | Feiring et al. | |
| 8,663,494 B2 | 3/2014 | Howell et al. | |
| 8,668,791 B2 | 3/2014 | Leck et al. | |
| 8,815,114 B2 * | 8/2014 | Rao | C09K 5/045 252/68 |
| 9,133,381 B2 * | 9/2015 | Feiring | C09K 5/045 |
| 2005/0029488 A1 | 2/2005 | Li et al. | |
| 2005/0151113 A1 | 7/2005 | Minor et al. | |
| 2005/0233934 A1 | 10/2005 | Singh et al. | |
| 2006/0022166 A1 | 2/2006 | Wilson et al. | |
| 2006/0033072 A1 | 2/2006 | Wilson et al. | |
| 2006/0043330 A1 | 3/2006 | Wilson et al. | |
| 2006/0243944 A1 | 11/2006 | Minor et al. | |
| 2006/0243945 A1 | 11/2006 | Minor et al. | |
| 2006/0287559 A1 | 12/2006 | Friesen et al. | |
| 2006/0293195 A1 | 12/2006 | Howell et al. | |
| 2007/0049502 A1 | 3/2007 | Howell et al. | |
| 2008/0157022 A1 | 7/2008 | Singh et al. | |
| 2008/0230738 A1 | 9/2008 | Minor et al. | |
| 2009/0288431 A1 | 11/2009 | Rao et al. | |
| 2010/0009155 A1 | 1/2010 | Hashii et al. | |

(Continued)

FOREIGN PATENT DOCUMENTS

| | | |
|---|---|---|
| EP | 0885952 A1 | 12/1998 |
| EP | 0947572 A1 | 10/1999 |

(Continued)

OTHER PUBLICATIONS

F. Jeanneaux, et al., Journal of Fluorine Chemistry, vol. 4 (Jul. 1974) pp. 261-270, France.
C. Coudures, et al., Journal of Fluorine Chemistry, vol. 24 (1984), pp. 93-104, France.
Viacheslave A. Petrov et al., New Partially Fluorinated Epoxides by Oxidation of Olefins with Sodium Hypohalites Under Phase Transfer Catalysis,Journal of Fluorine Chemistry, vol. 125 (2004), pp. 99-105, Russia.

(Continued)

Primary Examiner — John Hardee
(74) Attorney, Agent, or Firm — N. Lynn Tucker

(57) ABSTRACT

The present invention relates to compositions comprising at least one fluoroolefin and an effective amount of stabilizer that may be an epoxide, fluorinated epoxide or oxetane, or a mixture thereof with other stabilizers. The stabilized compositions may be useful in cooling apparatus, such as refrigeration, air-conditioning, chillers, and heat pumps, as well as in applications as foam blowing agents, solvents, aerosol propellants, fire extinguishants, and sterilants.

13 Claims, No Drawings

(56) References Cited

U.S. PATENT DOCUMENTS

| | | |
|---|---|---|
| 2010/0288965 A1 | 11/2010 | Howell et al. |
| 2010/0288966 A1 | 11/2010 | Leck et al. |
| 2010/0301259 A1 | 12/2010 | Leck et al. |
| 2011/0259022 A1 | 10/2011 | Feiring et al. |
| 2014/0020416 A1 | 1/2014 | Feiring et al. |

FOREIGN PATENT DOCUMENTS

| | | | |
|---|---|---|---|
| GB | 1587907 | A1 | 4/1981 |
| JP | 04110388 | A | 4/1992 |
| JP | 2006046102 | A | 2/2006 |
| RU | 2073058 | C1 | 2/1997 |
| WO | 9708116 | A1 | 3/1997 |
| WO | 03004944 | A2 | 1/2003 |
| WO | 2005044969 | A1 | 5/2005 |
| WO | 2005094395 | A2 | 10/2005 |
| WO | 2005/103187 | A1 | 11/2005 |
| WO | 2005103187 | A1 | 11/2005 |
| WO | 2005103192 | A1 | 11/2005 |
| WO | 2005/119143 | A2 | 12/2005 |
| WO | 2005119143 | A2 | 12/2005 |
| WO | 2006/069362 | A2 | 6/2006 |
| WO | 2006069362 | A2 | 6/2006 |
| WO | 2006094303 | A2 | 9/2006 |
| WO | 2006130406 | A2 | 12/2006 |
| WO | 2007053672 | A2 | 5/2007 |
| WO | 2007053697 | A2 | 5/2007 |
| WO | 2007126760 | A2 | 11/2007 |
| WO | 2008027594 | A2 | 3/2008 |
| WO | 2008/042066 | A1 | 4/2008 |

OTHER PUBLICATIONS

Ming H. Hung, et al., Direct Epoxidation of Fluorinated Olefins Using the F2—H20—CH3CN System, Journal of Organic Chemistry, vol. 56 (1991), pp. 3187-3189.

1990 ASHRAE Handbook, Refrigeration Systems and Applications, Chapter 8, titled "Lubricants in Refrigeration Systems," pp. 8.1-8.21.

"Synthetic Lubricants and High-Performance Fluids," Marcel Dekker, Inc., 1993, Chapter 2, titled "Esters" by Steven James Randles, pp. 41-65 and Chapter 4, titled "Polyalkylene Glycols" by Paul L. Matlock et. al, pp. 101-123.

International Search Report, Dec. 11, 2007.

E. N. Step et al., Mechanism of Polymer Stabilization by Hindered-Amine Light Stabilizers (HALS). Model Investigations of the Interaction of Peroxy Radicals with HALS Amines and Amino Ethers, American Chemical Society, Macromolecules, vol. 27, No. 9, 1994, pp. 2529-2539.

U.S. Appl. No. 12/377,485, filed Aug. 4, 2010 (National filing of PCT/US2007/19286 filed Aug. 31, 2007; see WO2008/042066).

* cited by examiner

EPOXIDE AND FLUORINATED EPOXIDE STABILIZERS FOR FLUOROOLEFINS

This application is a divisional application of and claims priority to U.S. application Ser. No. 13/967,780 filed Aug. 15, 2013, currently allowed, which is a divisional application of and claims priority to U.S. application Ser. No. 12/377,454 filed Apr. 11, 2011, granted (U.S. Pat. No. 8,535,555), which represents a national filing under 35 U.S.C. 371 of International Application No. PCT/US07/19140 filed Aug. 31, 2007, and claims priority of U.S. Provisional Application No. 60/921,529 filed Apr. 2, 2007, U.S. Provisional Application No. 60/841,907 filed Sep. 1, 2006, and U.S. Provisional Application No. 60/841,831 filed Sep. 1, 2006.

BACKGROUND OF THE INVENTION

1. Field of the Invention

The present invention relates to compositions comprising at least one fluoroolefin and a stabilizer. The stabilized compositions may be useful in cooling systems as replacements for existing refrigerants with higher global warming potential.

2. Description of Related Art

New environmental regulations on working fluids have forced the refrigeration and air-conditioning industry to look for new working fluids with low global warming potential (GWP).

Replacement working fluids are being sought that have low GWP, no toxicity, non-flammability, reasonable cost and excellent refrigeration performance.

Fluoroolefins have been proposed as working fluids alone or in mixtures. However, it has been observed that fluoroolefins can exhibit degradation when exposed to high temperatures or when contacted with other compounds (e.g., moisture, oxygen, or other compounds with which they may undergo condensation reactions. This degradation may occur when fluoroolefins are used as working fluids in heat transfer equipment (refrigeration or air-conditioning equipment, for instance) or when used in some other application. This degradation may occur by any number of different mechanisms. In one instance, the degradation may be caused by instability of the compounds at extreme temperatures. In other instances, the degradation may be caused by oxidation in the presence of air that has inadvertently leaked into the system. Whatever the cause of such degradation, because of the instability of the fluoroolefins, it may not be practical to incorporate these fluoroolefins into refrigeration or air-conditioning systems. Therefore, to take advantage of the many other attributes of fluoroolefins, means to reduce the degradation is needed.

SUMMARY OF THE INVENTION

The present disclosure provides a composition comprising at least one fluoroolefin and an effective amount of a stabilizer comprising:

a. at least one compound selected from the group consisting of epoxides and fluorinated epoxides represented by Formula A, wherein each of $R^2$ through $R^5$ is H, alkyl of 1 to 6 carbon atoms or fluoroalkyl of 1 to 6 carbon atoms with the proviso that at least one of $R^2$ through $R^5$ is a fluoroalkyl group;

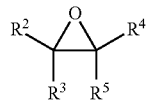

Formula A and b. at least one compound selected from the group consisting of thiophosphates, butylated triphenylphosphorothionates, organo phosphates, fullerenes, aryl alkyl ether, functionalized perfluoropolyethers, polyoxyalkylated aromatics, alkylated aromatics, oxetanes, ascorbic acid, thiols, lactones, thioethers, amines, nitromethane, alkylsilanes, benzophenone derivatives, aryl sulfides, divinyl terephthalate, diphenyl terephthalate, and mixtures thereof.

Also provided is a composition comprising:

a. at least one fluoroolefin; and
b. an effective amount of a stabilizer comprising:
 i) at least one epoxide, fluorinated epoxide or mixture thereof;
 ii) at least one phosphite, phenol, terpene, terpenoid, or mixture thereof; and
 iii) at least one metal deactivator selected from the group consisting of areoxalyl bis(benzylidene)hydrazide; N,N'-bis(3,5-di-tert-butyl-4-hydroxyhydrocinnamoyl-hydrazine); 2,2'-oxamidobis-ethyl-(3,5-d-tert-butyl-4-hydroxyhydorcinnamate); N,N'-(disalicyclidene)-1,2-propanediamine; ethyenediaminetetraacetic acid and salts thereof; triazoles; benzotriazole, 2-mercaptobenzothiazole, tolutriazole derivatives, N,N-disalicylidene-1,2-diaminopropane, and mixtures thereof.

Also provided is a method for stabilizing a composition comprising at least one fluoroolefin, said method comprising adding an effective amount of a stabilizer comprising at least one epoxide or fluorinated epoxide and at least one compound selected from the group consisting of thiophosphates, butylated triphenylphosphorothionates, organo phosphates, fullerenes, aryl alkyl ether, functionalized perfluoropolyethers, polyoxyalkylated aromatics, alkylated aromatics, oxetanes, ascorbic acid, thiols, lactones, thioethers, amines, nitromethane, alkylsilanes, benzophenone derivatives, aryl sulfides, divinyl terephthalate, diphenyl terephthalate, and mixtures thereof.

Also provided is a method for reducing degradation of a composition comprising at least one fluoroolefin, wherein said degradation is caused by the presence of inadvertent air in a refrigeration, air-conditioning or heat pump system, said method comprising adding an effective amount of a stabilizer comprising at least one epoxide or fluorinated epoxide and at least one compound selected from the group consisting of thiophosphates, butylated triphenylphosphorothionates, organo phosphates, fullerenes, aryl alkyl ether, functionalized perfluoropolyethers, polyoxyalkylated aromatics, alkylated aromatics, oxetanes, ascorbic acid, thiols, lactones, thioethers, amines, nitromethane, alkylsilanes, benzophenone derivatives, aryl sulfides, divinyl terephthalate, diphenyl terephthalate, and mixtures thereof to the composition comprising at least one fluoroolefin.

Also provided is a method for reducing reaction with oxygen for a composition comprising at least one fluoroolefin, said method comprising adding an effective amount of a stabilizer comprising at least one epoxide or fluorinated epoxide and at least one compound selected from the group consisting of thiophosphates, butylated triphenylphosphorothionates, organo phosphates, fullerenes, aryl alkyl ether, functionalized perfluoropolyethers, polyoxyalkylated aromatics, alkylated aromatics, oxetanes, ascorbic acid, thiols, lactones, thioethers, amines, nitromethane, alkylsilanes, benzophenone derivatives, aryl sulfides, divinyl terephthalate, diphenyl terephthalate, and mixtures thereof to the composition comprising at least one fluoroolefin.

DETAILED DESCRIPTION OF THE INVENTION

The present invention provides a composition comprising at least one fluoroolefin and an effective amount of a stabilizer comprising: a. at least one epoxide or fluorinated epoxide.

These compositions have a variety of utilities in working fluids, which include use as These compositions have a variety of utilities in working fluids, which include use as foaming agents, blowing agents, fire extinguishing agents, heat transfer mediums (such as heat transfer fluids and refrigerants for use in refrigeration systems, refrigerators, air conditioning systems, heat pumps, chillers, and the like), to name a few.

A blowing agent is a volatile composition that expands a polymer matrix to form a cellular structure.

A solvent is a fluid that removes a soil from a substrate, or deposits a material onto a substrate, or carries a material.

An aerosol propellant is a volatile composition of one or more components that exerts a pressure greater than one atmosphere to expel a material from a container.

A fire extinguishant is a volatile composition that extinguishes or suppresses a flame.

A sterilant is a volatile biocidal fluid or blend containing a volatile biocidal fluid that destroys a biologically active material or the like.

A heat transfer medium (also referred to herein as a heat transfer fluid, a heat transfer composition or a heat transfer fluid composition) is a working fluid used to carry heat from a heat source to a heat sink.

A refrigerant is a compound or mixture of compounds that function as a heat transfer fluid in a cycle wherein the fluid undergoes a phase change from a liquid to a gas and back.

The term fluoroolefins, as used herein, describes compounds which comprise carbon atoms, fluorine atoms, and optionally hydrogen atoms. In one embodiment, the fluoroolefins used in the compositions of the present invention comprise compounds with 2 to 12 carbon atoms. In another embodiment the fluoroolefins comprise compounds with 3 to 10 carbon atoms, and in yet another embodiment the fluoroolefins comprise compounds with 3 to 7 carbon atoms. Representative fluoroolefins include but are not limited to all compounds as listed in Table 1, Table 2, and Table 3.

One embodiment of the present invention provides fluoroolefins having the formula E- or Z—$R^1CH=CHR^2$ (Formula I), wherein $R^1$ and $R^2$ are, independently, $C_1$ to $C_6$ perfluoroalkyl groups. Examples of $R^1$ and $R^2$ groups include, but are not limited to, $CF_3$, $C_2F_5$, $CF_2CF_2CF_3$, $CF(CF_3)_2$, $CF_2CF_2CF_2CF_3$, $CF(CF_3)CF_2CF_3$, $CF_2CF(CF_3)_2$, $C(CF_3)_3$, $CF_2CF_2CF_2CF_2CF_3$, $CF_2CF_2CF(CF_3)_2$, $C(CF_3)_2C_2F_5$, $CF_2CF_2CF_2CF_2CF_3$, $CF(CF_3)CF_2CF_2C_2F_5$, and $C(CF_3)_2CF_2C_2F_5$. In one embodiment the fluoroolefins of Formula I have at least about 4 carbon atoms in the molecule. In another embodiment, the fluoroolefins of Formula I have at least about 5 carbon atoms in the molecule. Exemplary, non-limiting Formula I compounds are presented in Table 1.

TABLE 1

| Code | Structure | Chemical Name |
|---|---|---|
| F11E | $CF_3CH=CHCF_3$ | 1,1,1,4,4,4-hexafluorobut-2-ene |
| F12E | $CF_3CH=CHC_2F_5$ | 1,1,1,4,4,5,5,5-octafluoropent-2-ene |
| F13E | $CF_3CH=CHCF_2C_2F_5$ | 1,1,1,4,4,5,5,6,6,6-decafluorohex-2-ene |
| F13iE | $CF_3CH=CHCF(CF_3)_2$ | 1,1,1,4,5,5,5-heptafluoro-4-(trifluoromethyl)pent-2-ene |
| F22E | $C_2F_5CH=CHC_2F_5$ | 1,1,1,2,2,5,5,6,6,6-decafluorohex-3-ene |
| F14E | $CF_3CH=CH(CF_2)_3CF_3$ | 1,1,1,4,4,5,5,6,6,7,7,7-dodecafluorohept-2-ene |
| F14iE | $CF_3CH=CHCF_2CF—(CF_3)_2$ | 1,1,1,4,4,5,6,6,6-nonafluoro-5-(trifluoromethyl)hex-2-ene |
| F14sE | $CF_3CH=CHCF(CF_3)—C_2F_5$ | 1,1,1,4,5,5,6,6,6-nonfluoro-4-(trifluoromethyl)hex-2-ene |
| F14tE | $CF_3CH=CHC(CF_3)_3$ | 1,1,1,5,5,5-hexafluoro-4,4-bis(trifluoromethyl)pent-2-ene |
| F23E | $C_2F_5CH=CHCF_2C_2F_5$ | 1,1,1,2,2,5,5,6,6,7,7,7-dodecafluorohept-3-ene |
| F23iE | $C_2F_5CH=CHCF(CF_3)_2$ | 1,1,1,2,2,5,6,6,6-nonafluoro-5-(trifluoromethyl)hex-3-ene |
| F15E | $CF_3CH=CH(CF_2)_4CF_3$ | 1,1,1,4,4,5,5,6,6,7,7,8,8,8-tetradecafluorooct-2-ene |
| F15iE | $CF_3CH=CH—CF_2CF_2CF(CF_3)_2$ | 1,1,1,4,4,5,5,6,7,7,7-undecafluoro-6-(trifluoromethyl)hept-2-ene |
| F15tE | $CF_3CH=CH—C(CF_3)_2C_2F_5$ | 1,1,1,5,5,6,6,6-octafluoro-4,4-bis(trifluoromethyl)hex-2-ene |
| F24E | $C_2F_5CH=CH(CF_2)_3CF_3$ | 1,1,1,2,2,5,5,6,6,7,7,8,8,8-tetradecafluorooct-3-ene |
| F24iE | $C_2F_5CH=CHCF_2CF—(CF_3)_2$ | 1,1,1,2,2,5,5,6,7,7,7-undecafluoro-6-(trifluoromethyl)hept-3-ene |
| F24sE | $C_2F_5CH=CHCF(CF_3)—C_2F_5$ | 1,1,1,2,2,5,6,6,7,7,7-undecafluoro-5-(trifluoromethyl)hept-3-ene |
| F24tE | $C_2F_5CH=CHC(CF_3)_3$ | 1,1,1,2,2,6,6,6-octafluoro-5,5-bis(trifluoromethyl)hex-3-ene |
| F33E | $C_2F_5CF_2CH=CH—CF_2C_2F_5$ | 1,1,1,2,2,3,3,6,6,7,7,8,8,8-tetradecafluorooct-4-ene |
| F3i3iE | $(CF_3)_2CFCH=CH—CF(CF_3)_2$ | 1,1,1,2,5,6,6,6-octafluoro-2,5-bis(trifluoromethyl)hex-3-ene |
| F33iE | $C_2F_5CF_2CH=CH—CF(CF_3)_2$ | 1,1,1,2,5,5,6,6,7,7,7-undecafluoro-2-(trifluoromethyl)hept-3-ene |
| F16E | $CF_3CH=CH(CF_2)_5CF_3$ | 1,1,1,4,4,5,5,6,6,7,7,8,8,,9,9,9-hexadecafluoronon-2-ene |
| F16sE | $CF_3CH=CHCF(CF_3)(CF_2)_2C_2F_5$ | 1,1,1,4,5,5,6,6,7,7,8,8,8-tridecafluoro-4-(trifluoromethyl)hept-2-ene |
| F16tE | $CF_3CH=CHC(CF_3)_2CF_2C_2F_5$ | 1,1,1,6,6,6-octafluoro-4,4-bis(trifluoromethyl)hept-2-ene |
| F25E | $C_2F_5CH=CH(CF_2)_4CF_3$ | 1,1,1,2,2,5,5,6,6,7,7,8,8,9,9,9-hexadecafluoronon-3-ene |
| F25iE | $C_2F_5CH=CH—CF_2CF_2CF(CF_3)_2$ | 1,1,1,2,2,5,5,6,7,8,8,8-tridecafluoro-7-(trifluoromethyl)oct-3-ene |
| F25tE | $C_2F_5CH=CH—C(CF_3)_2C_2F_5$ | 1,1,1,2,2,6,6,7,7,7-decafluoro-5,5-bis(trifluoromethyl)hept-3-ene |
| F34E | $C_2F_5CF_2CH=CH—(CF_2)_3CF_3$ | 1,1,1,2,2,3,3,6,6,7,7,8,8,9,9,9-hexadecafluoronon-4-ene |
| F34iE | $C_2F_5CF_2CH=CH—CF_2CF(CF_3)_2$ | 1,1,1,2,2,3,3,6,7,7,8,8,8-tridecafluoro-7-(trifluoromethyl)oct-4-ene |
| F34sE | $C_2F_5CF_2CH=CH—CF(CF_3)C_2F_5$ | 1,1,1,2,2,3,3,6,7,7,8,8,8-tridecafluoro-6-(trifluoromethyl)oct-4-ene |
| F34tE | $C_2F_5CF_2CH=CH—C(CF_3)_3$ | 1,1,1,5,5,6,6,7,7,7-decafluoro-2,2-bis(trifluoromethyl)hept-3-ene |
| F3i4E | $(CF_3)_2CFCH=CH—(CF_2)_3CF_3$ | 1,1,1,2,5,5,6,6,7,7,8,8,8-tridecafluoro-2(trifluoromethyl)oct-3-ene |
| F3i4iE | $(CF_3)_2CFCH=CH—CF_2CF(CF_3)_2$ | 1,1,1,2,5,5,6,6,7,7,7-decafluoro-2,6-bis(trifluoromethyl)hept-3-ene |
| F3i4sE | $(CF_3)_2CFCH=CH—CF(CF_3)C_2F_5$ | 1,1,1,2,5,6,6,7,7,7-decafluoro-2,5-bis(trifluoromethyl)hept-3-ene |
| F3i4tE | $(CF_3)_2CFCH=CH—C(CF_3)_3$ | 1,1,1,2,6,6,6-heptafluoro-2,5,5-tris(trifluoromethyl)hex-3-ene |
| F26E | $C_2F_5CH=CH(CF_2)_5CF_3$ | 1,1,1,2,2,5,5,6,6,7,7,8,8,9,9,10,10,10-octadecafluorodec-3-ene |

TABLE 1-continued

| Code | Structure | Chemical Name |
|---|---|---|
| F26sE | $C_2F_5CH=CHCF(CF_3)(CF_2)_2C_2F_5$ | 1,1,1,2,2,5,6,6,7,7,8,8,9,9,9-pentadecafluoro-5-(trifluoromethyl)non-3-ene |
| F26tE | $C_2F_5CH=CHC(CF_3)_2CF_2C_2F_5$ | 1,1,1,2,2,6,6,7,7,8,8-dodecafluoro-5,5-bis(trifluoromethyl)oct-3-ene |
| F35E | $C_2F_5CF_2CH=CH-(CF_2)_4CF_3$ | 1,1,1,2,2,3,3,6,6,7,7,8,8,9,9,10,10,10-octadecafluorodec-4-ene |
| F35iE | $C_2F_5CF_2CH=CH-CF_2CF_2CF(CF_3)_2$ | 1,1,1,2,2,3,3,6,6,7,7,8,9,9,9-pentadecafluoro-8-(trifluoromethyl)non-4-ene |
| F35tE | $C_2F_5CF_2CH=CH-C(CF_3)_2C_2F_5$ | 1,1,1,2,2,3,3,7,7,8,8,8-dodecafluoro-6,6-bis(trifluoromethyl)oct-4-ene |
| F3i5E | $(CF_3)_2CFCH=CH-(CF_2)_4CF_3$ | 1,1,1,2,5,5,6,6,7,7,8,8,9,9,9-pentadecafluoro-2-(trifluoromethyl)non-3-ene |
| F3i5iE | $(CF_3)_2CFCH=CH-CF_2CF_2CF(CF_3)_2$ | 1,1,1,2,5,5,6,6,7,7,8,8,8-dodecafluoro-2,7-bis(trifluoromethyl)oct-3-ene |
| F3i5tE | $(CF_3)_2CFCH=CH-C(CF_3)_2C_2F_5$ | 1,1,1,2,6,6,7,7,7-nonafluoro-2,5,5-tris(trifluoromethyl)hept-3-ene |
| F44E | $CF_3(CF_2)_3CH=CH-(CF_2)_3CF_3$ | 1,1,1,2,2,3,3,4,4,7,7,8,8,9,9,10,10,10-octadecafluorodec-5-ene |
| F44iE | $CF_3(CF_2)_3CH=CH-CF_2CF(CF_3)_2$ | 1,1,1,2,3,3,6,6,7,7,8,8,9,9,9-pentadecafluoro-2-(trifluoromethyl)non-4-ene |
| F44sE | $CF_3(CF_2)_3CH=CH-CF(CF_3)C_2F_5$ | 1,1,1,2,2,3,3,6,6,7,7,8,8,9,9,9-pentadecafluoro-3-(trifluoromethyl)non-4-ene |
| F44tE | $CF_3(CF_2)_3CH=CH-C(CF_3)_3$ | 1,1,1,5,5,6,6,7,7,8,8,8-dodecafluoro-2,2,-bis(trifluoromethyl)oct-3-ene |
| F4i4iE | $(CF_3)_2CFCF_2CH=CH-CF_2CF(CF_3)_2$ | 1,1,1,2,3,3,6,6,7,8,8,8-dodecafluoro-2,7-bis(trifluoromethyl)oct-4-ene |
| F4i4sE | $(CF_3)_2CFCF_2CH=CH-CF(CF_3)C_2F_5$ | 1,1,1,2,3,3,6,7,7,8,8,8-dodecafluoro-2,6-bis(trifluoromethyl)oct-4-ene |
| F4i4tE | $(CF_3)_2CFCF_2CH=CH-C(CF_3)_3$ | 1,1,1,5,5,6,7,7,7-nonafluoro-2,2,6-tris(trifluoromethyl)hept-3-ene |
| F4s4sE | $C_2F_5CF(CF_3)CH=CH-CF(CF_3)C_2F_5$ | 1,1,1,2,2,3,3,6,7,7,8,8-dodecafluoro-3,6-bis(trifluoromethyl)oct-4-ene |
| F4s4tE | $C_2F_5CF(CF_3)CH=CH-C(CF_3)_3$ | 1,1,1,5,6,6,7,7,7-nonafluoro-2,2,5-tris(trifluoromethyl)hept-3-ene |
| F4t4tE | $(CF_3)_3CCH=CH-C(CF_3)_3$ | 1,1,1,6,6,6-hexafluoro-2,2,5,5-tetrakis(trifluoromethyl)hex-3-ene |

Compounds of Formula I may be prepared by contacting a perfluoroalkyl iodide of the formula $R^1I$ with a perfluoroalkyltrihydroolefin of the formula $R^2CH=CH_2$ to form a trihydroiodoperfluoroalkane of the formula $R^1CH_2CHIR^2$. This trihydroiodoperfluoroalkane can then be dehydroiodinated to form $R^1CH=CHR^2$. Alternatively, the olefin $R^1CH=CHR^2$ may be prepared by dehydroiodination of a trihydroiodoperfluoroalkane of the formula $R^1CHICH_2R^2$ formed in turn by reacting a perfluoroalkyl iodide of the formula $R^2I$ with a perfluoroalkyltrihydroolefin of the formula $R^1CH=CH_2$.

Said contacting of a perfluoroalkyl iodide with a perfluoroalkyltrihydroolefin may take place in batch mode by combining the reactants in a suitable reaction vessel capable of operating under the autogenous pressure of the reactants and products at reaction temperature. Suitable reaction vessels include fabricated from stainless steels, in particular of the austenitic type, and the well-known high nickel alloys such as Monel® nickel-copper alloys, Hastelloy® nickel based alloys and Inconel® nickel-chromium alloys.

Alternatively, the reaction may take be conducted in semi-batch mode in which the perfluoroalkyltrihydroolefin reactant is added to the perfluoroalkyl iodide reactant by means of a suitable addition apparatus such as a pump at the reaction temperature.

The ratio of perfluoroalkyl iodide to perfluoroalkyltrihydroolefin should be between about 1:1 to about 4:1, preferably from about 1.5:1 to 2.5:1. Ratios less than 1.5:1 tend to result in large amounts of the 2:1 adduct as reported by Jeanneaux, et. al. in *Journal of Fluorine Chemistry*, Vol. 4, pages 261-270 (1974).

Preferred temperatures for contacting of said perfluoroalkyl iodide with said perfluoroalkyltrihydroolefin are preferably within the range of about 150° C. to 300° C., preferably from about 170° C. to about 250° C., and most preferably from about 180° C. to about 230° C.

Suitable contact times for the reaction of the perfluoroalkyl iodide with the perfluoroalkyltrihydroolefin are from about 0.5 hour to 18 hours, preferably from about 4 to about 12 hours.

The trihydroiodoperfluoroalkane prepared by reaction of the perfluoroalkyl iodide with the perfluoroalkyltrihydroolefin may be used directly in the dehydroiodination step or may preferably be recovered and purified by distillation prior to the dehydroiodination step.

The dehydroiodination step is carried out by contacting the trihydroiodoperfluoroalkane with a basic substance. Suitable basic substances include alkali metal hydroxides (e.g., sodium hydroxide or potassium hydroxide), alkali metal oxide (for example, sodium oxide), alkaline earth metal hydroxides (e.g., calcium hydroxide), alkaline earth metal oxides (e.g., calcium oxide), alkali metal alkoxides (e.g., sodium methoxide or sodium ethoxide), aqueous ammonia, sodium amide, or mixtures of basic substances such as soda lime. Preferred basic substances are sodium hydroxide and potassium hydroxide. Said contacting of the trihydroiodoperfluoroalkane with a basic substance may take place in the liquid phase preferably in the presence of a solvent capable of dissolving at least a portion of both reactants. Solvents suitable for the dehydroiodination step include one or more polar organic solvents such as alcohols (e.g., methanol, ethanol, n-propanol, isopropanol, n-butanol, isobutanol, and tertiary butanol), nitriles (e.g., acetonitrile, propionitrile, butyronitrile, benzonitrile, or adiponitrile), dimethyl sulfoxide, N,N-dimethylformamide, N,N-dimethylacetamide, or sulfolane. The choice of solvent may depend on the boiling point product and the ease of separation of traces of the solvent from the product during purification. Typically, ethanol or isopropanol are good solvents for the reaction.

Typically, the dehydroiodination reaction may be carried out by addition of one of the reactants (either the basic substance or the trihydroiodoperfluoroalkane) to the other reactant in a suitable reaction vessel. Said reaction may be fabricated from glass, ceramic, or metal and is preferably agitated with an impeller or stirring mechanism.

Temperatures suitable for the dehydroiodination reaction are from about 10° C. to about 100° C., preferably from about 20° C. to about 70° C. The dehydroiodination reaction may be carried out at ambient pressure or at reduced or elevated pressure. Of note are dehydroiodination reactions in which the compound of Formula I is distilled out of the reaction vessel as it is formed.

Alternatively, the dehydroiodination reaction may be conducted by contacting an aqueous solution of said basic substance with a solution of the trihydroiodoperfluoroalkane in one or more organic solvents of lower polarity such as an alkane (e.g., hexane, heptane, or octane), aromatic hydrocarbon (e.g., toluene), halogenated hydrocarbon (e.g., methylene chloride, chloroform, carbon tetrachloride, or perchloroethylene), or ether (e.g., diethyl ether, methyl tert-butyl ether, tetrahydrofuran, 2-methyl tetrahydrofuran, dioxane, dimethoxyethane, diglyme, or tetraglyme) in the presence of a phase transfer catalyst. Suitable phase transfer catalysts include quaternary ammonium halides (e.g., tetrabutylammonium bromide, tetrabutylammonium hydrosulfate, triethylbenzylammonium chloride, dodecyltrimethylammonium chloride, and tricaprylylmethylammonium chloride), quaternary phosphonium halides (e.g., triphenylmethylphosphonium bromide and tetraphenylphosphonium chloride), or cyclic polyether compounds known in the art as crown ethers (e.g., 18-crown-6 and 15-crown-5).

Alternatively, the dehydroiodination reaction may be conducted in the absence of solvent by adding the trihydroiodoperfluoroalkane to a solid or liquid basic substance.

Suitable reaction times for the dehydroiodination reactions are from about 15 minutes to about six hours or more depending on the solubility of the reactants. Typically the dehydroiodination reaction is rapid and requires about 30 minutes to about three hours for completion. The compound of formula I may be recovered from the dehydroiodination reaction mixture by phase separation after addition of water, by distillation, or by a combination thereof.

In another embodiment of the present invention, fluoroolefins comprise cyclic fluoroolefins (cyclo-[CX=CY (CZW)$_n$—] (Formula II), wherein X, Y, Z, and W are independently selected from H and F, and n is an integer from 2 to 5). In one embodiment the fluoroolefins of Formula II, have at least about 3 carbon atoms in the molecule. In another embodiment, the fluoroolefins of Formula II have at least about 4 carbon atoms in the molecule. In yet another embodiment, the fluoroolefins of Formula II have at least about 5 carbon atoms in the molecule. Representative cyclic fluoroolefins of Formula II are listed in Table 2.

TABLE 2

| Cyclic fluoroolefins | Structure | Chemical name |
|---|---|---|
| FC-C1316cc | cyclo-$CF_2CF_2CF=CF-$ | 1,2,3,3,4,4-hexafluorocyclobutene |
| HFC-C1334cc | cyclo-$CF_2CF_2CH=CH-$ | 3,3,4,4-tetrafluorocyclobutene |
| HFC-C1436 | cyclo-$CF_2CF_2CF_2CH=CH-$ | 3,3,4,4,5,5,-hexafluorocyclopentene |
| FC-C1418y | cyclo-$CF_2CF=CFCF_2CF_2-$ | 1,2,3,3,4,4,5,5-octafluorocyclopentene |
| FC-C151-10y | cyclo-$CF_2CF=CFCF_2CF_2CF_2-$ | 1,2,3,4,4,5,5,6,6-decafluorocyclohexene |

The compositions of the present invention may comprise a single compound of Formula I or formula II, for example, one of the compounds in Table 1 or Table 2, or may comprise a combination of compounds of Formula I or formula II.

In another embodiment, fluoroolefins may comprise those compounds listed in Table 3.

TABLE 3

| Name | Structure | Chemical name |
|---|---|---|
| HFC-1225ye | $CF_3CF=CHF$ | 1,2,3,3,3-pentafluoro-1-propene |
| HFC-1225zc | $CF_3CH=CF_2$ | 1,1,3,3,3-pentafluoro-1-propene |
| HFC-1225yc | $CHF_2CF=CF_2$ | 1,1,2,3,3-pentafluoro-1-propene |
| HFC-1234ye | $CHF_2CF=CHF$ | 1,2,3,3-tetrafluoro-1-propene |
| HFC-1234yf | $CF_3CF=CH_2$ | 2,3,3,3-tetrafluoro-1-propene |
| HFC-1234ze | $CF_3CH=CHF$ | 1,3,3,3-tetrafluoro-1-propene |
| HFC-1234yc | $CH_2FCF=CF_2$ | 1,1,2,3-tetrafluoro-1-propene |
| HFC-1234zc | $CHF_2CH=CF_2$ | 1,1,3,3-tetrafluoro-1-propene |
| HFC-1243yf | $CHF_2CF=CH_2$ | 2,3,3-trifluoro-1-propene |
| HFC-1243zf | $CF_3CH=CH_2$ | 3,3,3-trifluoro-1-propene |
| HFC-1243yc | $CH_3CF=CF_2$ | 1,1,2-trifluoro-1-propene |
| HFC-1243zc | $CH_2FCH=CF_2$ | 1,1,3-trifluoro-1-propene |
| HFC-1243ye | $CH_2FCF=CHF$ | 1,2,3-trifluoro-1-propene |
| HFC-1243ze | $CHF_2CH=CHF$ | 1,3,3-trifluoro-1-propene |
| FC-1318my | $CF_3CF=CFCF_3$ | 1,1,1,2,3,4,4,4-octafluoro-2-butene |
| FC-1318cy | $CF_3CF_2CF=CF_2$ | 1,1,2,3,3,4,4,4-octafluoro-1-butene |
| HFC-1327my | $CF_3CF=CHCF_3$ | 1,1,1,2,4,4,4-heptafluoro-2-butene |
| HFC-1327ye | $CHF=CFCF_2CF_3$ | 1,2,3,3,4,4,4-heptafluoro-1-butene |
| HFC-1327py | $CHF_2CF=CFCF_3$ | 1,1,1,2,3,4,4-heptafluoro-2-butene |
| HFC-1327et | $(CF_3)_2C=CHF$ | 1,3,3,3-tetrafluoro-2-(trifluoromethyl)-1-propene |
| HFC-1327cz | $CF_2=CHCF_2CF_3$ | 1,1,3,3,4,4,4-heptafluoro-1-butene |
| HFC-1327cye | $CF_2=CFCHFCF_3$ | 1,1,2,3,4,4,4-heptafluoro-1-butene |
| HFC-1327cyc | $CF_2=CFCF_2CHF_2$ | 1,1,2,3,3,4,4-heptafluoro-1-butene |
| HFC-1336yf | $CF_3CF_2CF=CH_2$ | 2,3,3,4,4,4-hexafluoro-1-butene |
| HFC-1336ze | $CHF=CHCF_2CF_3$ | 1,3,3,4,4,4-hexafluoro-1-butene |
| HFC-1336eye | $CHF=CFCHFCF_3$ | 1,2,3,4,4,4-hexafluoro-1-butene |
| HFC-1336eyc | $CHF=CFCF_2CHF_2$ | 1,2,3,3,4,4-hexafluoro-1-butene |
| HFC-1336pyy | $CHF_2CF=CFCHF_2$ | 1,1,2,3,4,4-hexafluoro-2-butene |
| HFC-1336qy | $CH_2FCF=CFCF_3$ | 1,1,1,2,3,4-hexafluoro-2-butene |
| HFC-1336pz | $CHF_2CH=CFCF_3$ | 1,1,1,2,4,4-hexafluoro-2-butene |
| HFC-1336mzy | $CF_3CH=CFCHF_2$ | 1,1,1,3,4,4-hexafluoro-2-butene |
| HFC-1336qc | $CF_2=CFCF_2CH_2F$ | 1,1,2,3,3,4-hexafluoro-1-butene |
| HFC-1336pe | $CF_2=CFCHFCHF_2$ | 1,1,2,3,4,4-hexafluoro-1-butene |
| HFC-1336ft | $CH_2=C(CF_3)_2$ | 3,3,3-trifluoro-2-(trifluoromethyl)-1-propene |
| HFC-1345qz | $CH_2FCH=CFCF_3$ | 1,1,1,2,4-pentafluoro-2-butene |

TABLE 3-continued

| Name | Structure | Chemical name |
|---|---|---|
| HFC-1345mzy | $CF_3CH=CFCH_2F$ | 1,1,1,3,4-pentafluoro-2-butene |
| HFC-1345fz | $CF_3CF_2CH=CH_2$ | 3,3,4,4,4-pentafluoro-1-butene |
| HFC-1345mzz | $CHF_2CH=CHCF_3$ | 1,1,1,4,4-pentafluoro-2-butene |
| HFC-1345sy | $CH_3CF=CFCF_3$ | 1,1,1,2,3-pentafluoro-2-butene |
| HFC-1345fyc | $CH_2=CFCF_2CHF_2$ | 2,3,3,4,4-pentafluoro-1-butene |
| HFC-1345pyz | $CHF_2CF=CHCHF_2$ | 1,1,2,4,4-pentafluoro-2-butene |
| HFC-1345cyc | $CH_3CF_2CF=CF_2$ | 1,1,2,3,3-pentafluoro-1-butene |
| HFC-1345pyy | $CH_2FCF=CFCHF_2$ | 1,1,2,3,4-pentafluoro-2-butene |
| HFC-1345eyc | $CH_2FCF_2CF=CF_2$ | 1,2,3,3,4-pentafluoro-1-butene |
| HFC-1345ctm | $CF_2=C(CF_3)(CH_3)$ | 1,1,3,3,3-pentafluoro-2-methyl-1-propene |
| HFC-1345ftp | $CH_2=C(CHF_2)(CF_3)$ | 2-(difluoromethyl)-3,3,3-trifluoro-1-propene |
| HFC1345fye | $CH_2=CFCHFCF_3$ | 2,3,4,4,4-pentafluoro-1-butene |
| HFC-1345eyf | $CHF=CFCH_2CF_3$ | 1,2,4,4,4-pentafluoro-1-butene |
| HFC-1345eze | $CHF=CHCHFCF_3$ | 1,3,4,4,4-pentafluoro-1-butene |
| HFC-1345ezc | $CHF=CHCF_2CHF_2$ | 1,3,3,4,4-pentafluoro-1-butene |
| HFC-1345eye | $CHF=CFCHFCHF_2$ | 1,2,3,4,4-pentafluoro-1-butene |
| HFC-1354fzc | $CH_2=CHCF_2CHF_2$ | 3,3,4,4-tetrafluoro-1-butene |
| HFC-1354ctp | $CF_2=C(CHF_2)(CH_3)$ | 1,1,3,3-tetrafluoro-2-methyl-1-propene |
| HFC-1354etm | $CHF=C(CF_3)(CH_3)$ | 1,3,3,3-tetrafluoro-2-methyl-1-propene |
| HFC-1354tfp | $CH_2=C(CHF_2)_2$ | 2-(difluoromethyl)-3,3-difluoro-1-propene |
| HFC-1354my | $CF_3CF=CHCH_3$ | 1,1,1,2-tetrafluoro-2-butene |
| HFC-1354mzy | $CH_3CF=CHCF_3$ | 1,1,1,3-tetrafluoro-2-butene |
| FC-141-10myy | $CF_3CF=CFCF_3$ | 1,1,1,2,3,4,5,5,5-decafluoro-2-pentene |
| FC-141-10cy | $CF_2=CFCF_2CF_2CF_3$ | 1,1,2,3,3,4,4,5,5,5-decafluoro-1-pentene |
| HFC-1429mzt | $(CF_3)_2C=CHCF_3$ | 1,1,1,4,4,4-hexafluoro-2-(trifluoromethyl)-2-butene |
| HFC-1429myz | $CF_3CF=CHCF_2CF_3$ | 1,1,1,2,4,4,5,5,5-nonafluoro-2-pentene |
| HFC-1429mzy | $CF_3CH=CFCF_2CF_3$ | 1,1,1,3,4,4,5,5,5-nonafluoro-2-pentene |
| HFC-1429eyc | $CHF=CFCF_2CF_2CF_3$ | 1,2,3,3,4,4,5,5,5-nonafluoro-1-pentene |
| HFC-1429czc | $CF_2=CHCF_2CF_2CF_3$ | 1,1,3,3,4,4,5,5,5-nonafluoro-1-pentene |
| HFC-1429cycc | $CF_2=CFCF_2CF_2CHF_2$ | |
| HFC-1429pyy | $CHF_2CF=CFCF_2CF_3$ | 1,1,2,3,4,4,5,5,5-nonafluoro-2-pentene |
| HFC-1429myyc | $CF_3CF=CFCF_2CHF_2$ | 1,1,1,2,3,4,4,5,5-nonafluoro-2-pentene |
| HFC-1429myye | $CF_3CF=CFCHFCF_3$ | 1,1,1,2,3,4,5,5,5-nonafluoro-2-pentene |
| HFC-1429eyym | $CHF=CFCF(CF_3)_2$ | 1,2,3,4,4,4-hexafluoro-3-(trifluoromethyl)-1-butene |
| HFC-1429cyzm | $CF_2=CFCH(CF_3)_2$ | 1,1,2,4,4,4-hexafluoro-3-(trifluoromethyl)-1-butene |
| HFC-1429mzt | $CF_3CH=C(CF_3)_2$ | 1,1,1,4,4,4-hexafluoro-2-(trifluoromethyl)-2-butene |
| HFC-1429czym | $CF_2=CHCHF(CF_3)_2$ | 1,1,3,4,4,4-hexafluoro-3-(trifluoromethyl)-1-butene |
| HFC-1438fy | $CH_2=CFCF_2CF_2CF_3$ | 2,3,3,4,4,5,5,5-octafluoro-1-pentene |
| HFC-1438eycc | $CHF=CFCF_2CF_2CHF_2$ | 1,2,3,3,4,4,5,5-octafluoro-1-pentene |
| HFC-1438ftmc | $CH_2=C(CF_3)CF_2CF_3$ | 3,3,4,4,4-pentafluoro-2-(trifluoromethyl)-1-butene |
| HFC-1438czzm | $CF_2=CHCH(CF_3)_2$ | 1,1,4,4,4-pentafluoro-3-(trifluoromethyl)-1-butene |
| HFC-1438ezym | $CHF=CHCF(CF_3)_2$ | 1,3,4,4,4-pentafluoro-3-(trifluoromethyl)-1-butene |
| HFC-1438ctmf | $CF_2=C(CF_3)CH_2CF_3$ | 1,1,4,4,4-pentafluoro-2-(trifluoromethyl)-1-butene |
| HFC-1447fzy | $(CF_3)_2CFCH=CH_2$ | 3,4,4,4-tetrafluoro-3-(trifluoromethyl)-1-butene |
| HFC-1447fz | $CF_3CF_2CF_2CH=CH_2$ | 3,3,4,4,5,5,5-heptafluoro-1-pentene |
| HFC-1447fycc | $CH_2=CFCF_2CF_2CHF_2$ | 2,3,3,4,4,5,5-heptafluoro-1-pentene |
| HFC-1447czcf | $CF_2=CHCF_2CH_2CF_3$ | 1,1,3,3,5,5,5-heptafluoro-1-pentene |
| HFC-1447mytm | $CF_3CF=C(CF_3)(CH_3)$ | 1,1,1,2,4,4,4-heptafluoro-3-methyl-2-butene |
| HFC-1447fyz | $CH_2=CFCH(CF_3)_2$ | 2,4,4,4-tetrafluoro-3-(trifluoromethyl)-1-butene |
| HFC-1447ezz | $CHF=CHCH(CF_3)_2$ | 1,4,4,4-tetrafluoro-3-(trifluoromethyl)-1-butene |
| HFC-1447qzt | $CH_2FCH=C(CF_3)_2$ | 1,4,4,4-tetrafluoro-2-(trifluoromethyl)-2-butene |
| HFC-1447syt | $CH_3CF=C(CF_3)_2$ | 2,4,4,4-tetrafluoro-2-(trifluoromethyl)-2-butene |
| HFC-1456szt | $(CF_3)_2C=CHCH_3$ | 3-(trifluoromethyl)-4,4,4-trifluoro-2-butene |
| HFC-1456szy | $CF_3CF_2CF=CHCH_3$ | 3,4,4,5,5,5-hexafluoro-2-pentene |
| HFC-1456mstz | $CF_3C(CH_3)=CHCF_3$ | 1,1,1,4,4,4-hexafluoro-2-methyl-2-butene |
| HFC-1456fzce | $CH_2=CHCF_2CHFCF_3$ | 3,3,4,5,5,5-hexafluoro-1-pentene |
| HFC-1456ftmf | $CH_2=C(CF_3)CH_2CF_3$ | 4,4,4-trifluoro-2-(trifluoromethyl)-1-butene |
| FC-151-12c | $CF_3(CF_2)_3CF=CF_2$ | 1,1,2,3,3,4,4,5,5,6,6,6-dodecafluoro-1-hexene (or perfluoro-1-hexene) |
| FC-151-12mcy | $CF_3CF_2CF=CFCF_2CF_3$ | 1,1,1,2,2,3,4,5,5,6,6,6-dodecafluoro-3-hexene (or perfluoro-3-hexene) |
| FC-151-12mmtt | $(CF_3)_2C=C(CF_3)_2$ | 1,1,1,4,4,4-hexafluoro-2,3-bis(trifluoromethyl)-2-butene |
| FC-151-12mmzz | $(CF_3)_2CFCF=CFCF_3$ | 1,1,1,2,3,4,5,5,5-nonafluoro-4-(trifluoromethyl)-2-pentene |
| HFC-152-11mmtz | $(CF_3)_2C=CHC_2F_5$ | 1,1,1,4,4,5,5,5-octafluoro-2-(trifluoromethyl)-2-pentene |
| HFC-152-11mmyyz | $(CF_3)_2CFCF=CHCF_3$ | 1,1,1,3,4,5,5,5-octafluoro-4-(trifluoromethyl)-2-pentene |
| PFBE (or HFC-1549fz) | $CF_3CF_2CF_2CF_2CH=CH_2$ | 3,3,4,4,5,5,6,6,6-nonafluoro-1-hexene (or perfluorobutylethylene) |
| HFC-1549fztmm | $CH_2=CHC(CF_3)_3$ | 4,4,4-trifluoro-3,3-bis(trifluoromethyl)-1-butene |
| HFC-1549mmtts | $(CF_3)_2C=C(CH_3)(CF_3)$ | 1,1,1,4,4,4-hexafluoro-3-methyl-2-(trifluoromethyl)-2-butene |
| HFC-1549fycz | $CH_2=CFCF_2CH(CF_3)_2$ | 2,3,3,5,5,5-hexafluoro-4-(trifluoromethyl)-1-pentene |
| HFC-1549myts | $CF_3CF=C(CH_3)CF_2CF_3$ | 1,1,1,2,4,4,5,5,5-nonafluoro-3-methyl-2-pentene |
| HFC-1549mzzz | $CF_3CH=CHCH(CF_3)_2$ | 1,1,1,5,5,5-hexafluoro-4-(trifluoromethyl)-2-pentene |
| HFC-1558szy | $CF_3CF_2CF_2CF=CHCH_3$ | 3,4,4,5,5,6,6,6-octafluoro-2-hexene |
| HFC-1558fzccc | $CH_2=CHCF_2CF_2CF_2CHF_2$ | 3,3,4,4,5,5,6,6-octafluoro-2-hexene |
| HFC-1558mmtzc | $(CF_3)_2C=CHCF_2CH_3$ | 1,1,1,4,4-pentafluoro-2-(trifluoromethyl)-2-pentene |
| HFC-1558ftmf | $CH_2=C(CF_3)CH_2C_2F_5$ | 4,4,5,5,5-pentafluoro-2-(trifluoromethyl)-1-pentene |
| HFC-1567fts | $CF_3CF_2CF_2C(CH_3)=CH_2$ | 3,3,4,4,5,5,5-heptafluoro-2-methyl-1-pentene |

TABLE 3-continued

| Name | Structure | Chemical name |
|---|---|---|
| HFC-1567szz | $CF_3CF_2CF_2CH=CHCH_3$ | 4,4,5,5,6,6,6-heptafluoro-2-hexene |
| HFC-1567fzfc | $CH_2=CHCH_2CF_2C_2F_5$ | 4,4,5,5,6,6,6-heptafluoro-1-hexene |
| HFC-1567sfyy | $CF_3CF_2CF=CFC_2H_5$ | 1,1,1,2,2,3,4-heptafluoro-3-hexene |
| HFC-1567fzfy | $CH_2=CHCH_2CF(CF_3)_2$ | 4,5,5,5-tetrafluoro-4-(trifluoromethyl)-1-pentene |
| HFC-1567myzzm | $CF_3CF=CHCH(CF_3)(CH_3)$ | 1,1,1,2,5,5,5-heptafluoro-4-methyl-2-pentene |
| HFC-1567mmtyf | $(CF_3)_2C=CFC_2H_5$ | 1,1,1,3-tetrafluoro-2-(trifluoromethyl)-2-pentene |
| FC-161-14myy | $CF_3CF=CFCF_2CF_2C_2F_5$ | 1,1,1,2,3,4,4,5,5,6,6,7,7,7-tetradecafluoro-2-heptene |
| FC-161-14mcyy | $CF_3CF_2CF=CFCF_2C_2F_5$ | 1,1,1,2,2,3,4,5,5,6,6,7,7,7-tetradecafluoro-2-heptene |
| HFC-162-13mzy | $CF_3CH=CFCF_2CF_2C_2F_5$ | 1,1,1,3,4,4,5,5,6,6,7,7,7-tridecafluoro-2-heptene |
| HFC162-13myz | $CF_3CF=CHCF_2CF_2C_2F_5$ | 1,1,1,2,4,4,5,5,6,6,7,7,7-tridecafluoro-2-heptene |
| HFC-162-13mczy | $CF_3CF_2CH=CFCF_2C_2F_5$ | 1,1,1,2,2,4,5,5,6,6,7,7,7-tridecafluoro-3-heptene |
| HFC-162-13mcyz | $CF_3CF_2CF=CHCF_2C_2F_5$ | 1,1,1,2,2,3,5,5,6,6,7,7,7-tridecafluoro-3-heptene |
| PEVE | $CF_2=CFOCF_2CF_3$ | pentafluoroethyl trifluorovinyl ether |
| PMVE | $CF_2=CFOCF_3$ | trifluoromethyl trifluorovinyl ether |

The compounds listed in Table 2 and Table 3 are available commercially or may be prepared by processes known in the art or as described herein.

1,1,1,4,4-pentafluoro-2-butene may be prepared from 1,1,1,2,4,4-hexafluorobutane ($CHF_2CH_2CHFCF_3$) by dehydrofluorination over solid KOH in the vapor phase at room temperature. The synthesis of 1,1,1,2,4,4-hexafluorobutane is described in U.S. Pat. No. 6,066,768, incorporated herein by reference.

1,1,1,4,4-hexafluoro-2-butene may be prepared from 1,1,1,4,4-hexafluoro-2-iodobutane ($CF_3CHICH_2CF_3$) by reaction with KOH using a phase transfer catalyst at about 60° C. The synthesis of 1,1,1,4,4,4-hexafluoro-2-iodobutane may be carried out by reaction of perfluoromethyl iodide ($CF_3I$) and 3,3,3-trifluoropropene ($CF_3CH=CH_2$) at about 200° C. under autogenous pressure for about 8 hours.

3,4,4,5,5,5-hexafluoro-2-pentene may be prepared by dehydrofluorination of 1,1,1,2,2,3,3-heptafluoropentane ($CF_3CF_2CF_2CH_2CH_3$) using solid KOH or over a carbon catalyst at 200-300° C. 1,1,1,2,2,3,3-heptafluoropentane may be prepared by hydrogenation of 3,3,4,4,5,5,5-heptafluoro-1-pentene ($CF_3CF_2CF_2CH=CH_2$).

1,1,1,2,3,4-hexafluoro-2-butene may be prepared by dehydrofluorination of 1,1,1,2,3,3,4-heptafluorobutane ($CH_2FCF_2CHFCF_3$) using solid KOH.

1,1,1,2,4,4-hexafluoro-2-butene may be prepared by dehydrofluorination of 1,1,1,2,2,4,4-heptafluorobutane ($CHF_2CH_2CF_2CF_3$) using solid KOH.

1,1,1,3,4,4-hexafluoro2-butene may be prepared by dehydrofluorination of 1,1,1,3,3,4,4-heptafluorobutane ($CF_3CH_2CF_2CHF_2$) using solid KOH.

1,1,1,2,4-pentafluoro-2-butene may be prepared by dehydrofluorination of 1,1,1,2,2,3-hexafluorobutane ($CH_2FCH_2CF_2CF_3$) using solid KOH.

1,1,1,3,4-pentafluoro-2-butene may be prepared by dehydrofluorination of 1,1,1,3,3,4-hexafluorobutane ($CF_3CH_2CF_2CH_2F$) using solid KOH.

1,1,1,3-tetrafluoro-2-butene may be prepared by reacting 1,1,1,3,3-pentafluorobutane ($CF_3CH_2CF_2CH_3$) with aqueous KOH at 120° C.

1,1,1,4,4,5,5,5-octafluoro-2-pentene may be prepared from ($CF_3CHICH_2CF_2CF_3$) by reaction with KOH using a phase transfer catalyst at about 60° C. The synthesis of 4-iodo-1,1,1,2,2,5,5,5-octafluoropentane may be carried out by reaction of perfluoroethyliodide ($CF_3CF_2I$) and 3,3,3-trifluoropropene at about 200° C. under autogenous pressure for about 8 hours.

1,1,1,2,2,5,5,6,6,6-decafluoro-3-hexene may be prepared from 1,1,1,2,2,5,5,6,6,6-decafluoro-3-iodohexane ($CF_3CF_2CHICH_2CF_2CF_3$) by reaction with KOH using a phase transfer catalyst at about 60° C. The synthesis of 1,1,1,2,2,5,5,6,6,6-decafluoro-3-iodohexane may be carried out by reaction of perfluoroethyliodide ($CF_3CF_2I$) and 3,3,4,4,4-pentafluoro-1-butene ($CF_3CF_2CH=CH_2$) at about 200° C. under autogenous pressure for about 8 hours.

1,1,1,4,5,5,5-heptafluoro-4-(trifluoromethyl)-2-pentene may be prepared by the dehydrofluorination of 1,1,1,2,5,5,5-heptafluoro-4-iodo-2-(trifluoromethyl)-pentane ($CF_3CHICH_2CF(CF_3)_2$) with KOH in isopropanol. $CF_3CHICH_2CF(CF_3)_2$ is made from reaction of $(CF_3)_2CFI$ with $CF_3CH=CH_2$ at high temperature, such as about 200° C.

1,1,1,4,4,5,5,6,6,6-decafluoro-2-hexene may be prepared by the reaction of 1,1,1,4,4,4-hexafluoro-2-butene ($CF_3CH=CHCF_3$) with tetrafluoroethylene ($CF_2=CF_2$) and antimony pentafluoride ($SbF_5$).

2,3,3,4,4-pentafluoro-1-butene may be prepared by dehydrofluorination of 1,1,2,2,3,3-hexafluorobutane over fluorided alumina at elevated temperature.

2,3,3,4,4,5,5,5-ocatafluoro-1-pentene may be prepared by dehydrofluorination of 2,2,3,3,4,4,5,5,5-nonafluoropentane over solid KOH.

1,2,3,3,4,4,5,5-octafluoro-1-pentene may be prepared by dehydrofluorination of 2,2,3,3,4,4,5,5,5-nonafluoropentane over fluorided alumina at elevated temperature.

Many of the compounds of Formula I, Formula II, Table 1, Table 2, and Table 3 exist as different configurational isomers or stereoisomers. When the specific isomer is not designated, the present invention is intended to include all single configurational isomers, single stereoisomers, or any combination thereof. For instance, F11E is meant to represent the E-isomer, Z-isomer, or any combination or mixture of both isomers in any ratio. As another example, HFC-1225ye is meant to represent the E-isomer, Z-isomer, or any combination or mixture of both isomers in any ratio.

The present invention provides a composition comprising at least one fluoroolefin and an effective amount of a stabilizer comprising: a. at least one epoxide or fluorinated epoxide; and b. at least one compound selected from the group consisting of thiophosphates, butylated triphenylphosphorothionates, organophosphates, fullerenes, aryl alkyl ether, functionalized perfluoropolyethers, polyoxyalkylated aromatics, alkylated aromatics, oxetanes, ascorbic acid, thiols, lactones, thioethers, amines, nitromethane, alkylsilanes, benzophenone derivatives, aryl sulfides, divinyl terephthalate, diphenyl terephthalate, and mixtures thereof.

In one embodiment, the stabilizers of the present invention comprise at least one epoxide. Epoxides include 1,2-propylene oxide (CAS reg. no. [75-56-9]), 1,2-butylene oxide (CAS reg. no. [106-88-7]), butylphenylglycidy ether, pentylphenylglycidyl ether, hexylphenylglycidyl ether, heptylphenylglycidyl ether, octylphenylglycidyl ether, nonylphenylglycidyl ether, decylphenylglycidyl ether, glycidyl methylphenylether, 1,4-glycidyl phenyl diether, 4-methoxyphenylglycidyl ether, naphthyl glycidyl ether, 1,4-diglycidyl naphthyl diether, butylphenyl glycidyl ether, n-butyl glycidyl ether, isobutyl glycidyl ether, hexanediol diglycidyl ether, allyl glycidyl ether, polypropylene glycol diglycidyl ether, and mixtures thereof.

In another embodiment, the stabilizers of the present invention comprise at least one fluorinated epoxide. The fluorinated epoxide stabilizers of the present invention may be depicted by Formula A, wherein each of $R^2$ through $R^5$ is H, alkyl of 1 to 6 carbon atoms or fluoroalkyl of 1 to 6 carbon atoms with the proviso that at least one of $R^2$ through $R^5$ is a fluoroalkyl group.

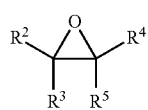

Formula A

Representative fluorinated epoxide stabilizers include but are not limited to trifluoromethyloxirane and 1,1-bis(trifluoromethyl)oxirane. Such compounds may be prepared by methods known in the art, for instance by methods described in, *Journal of Fluorine Chemistry*, volume 24, pages 93-104 (1984), *Journal of Organic Chemistry*, volume 56, pages 3187 to 3189 (1991), and *Journal of Fluorine Chemistry*, volume 125, pages 99-105 (2004).

The composition of the present invention additionally comprise a compound selected from a different class of compounds. This additional stabilizer is selected from the group consisting of thiophosphates, butylated triphenylphosphorothionates, organophosphates, fullerenes, functionalized perfluoropolyethers, polyoxyalkylated aromatics, alkylated aromatics, oxetanes, ascorbic acid, thiols, lactones, thioethers, amines, nitromethane, alkylsilanes, benzophenone derivatives, aryl sulfides, divinyl terephthalate, and diphenyl terephthalate, and mixtures thereof, meaning mixtures of any of the stabilizers listed in this paragraph, and in addition, mixtures of any stabilizer or combination of stabilizers listed in this paragraph with any of the stabilizers or combination of the epoxide or fluorinated epoxide stabilizers described above.

In one embodiment, the stabilizers of the present invention comprise at least one thiophosphate. The thiophosphate stabilizers of the present invention are compounds derived from phosphoric acids by substituting divalent sulfur for one or more oxygen atoms. These may be monothiophosphates, dithiophosphates or higher order. A representative dithiophosphate is commercially available from Ciba Specialty Chemicals of Basel, Switzerland (hereinafter "Ciba") under the trademark Irgalube® 63. In another embodiment, thiophosphates include dialkylthiophosphate esters. A representative dialkylthiophosphate ester stabilizer is commercially available from Ciba under the trademark Irgalube® 353.

In another embodiment, the stabilizers of the present invention comprise at least one butylated triphenylphosphorothionate as depicted by Formula B.

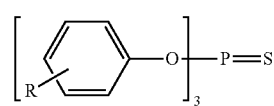

Formula B

An example of a butylated triphenylphosphorothionate, wherein each R is independently selected from H or tert-butyl, is commercially available from Ciba under the trademark Irgalube® 232.

In another embodiment, the stabilizers of the present invention comprise at least one organophosphate. The organophosphate stabilizers include but are not limited to amine phosphates, trialkyl phosphates, triaryl phosphates, mixed alkyl-aryl phosphates (alkyldiaryl, dialkylaryl or alkylated aryl), and cyclic phosphates. A representative amine phosphate is commercially available from Ciba under the trademark Irgalube® 349. Representative trialkyl phosphates include: trimethyl phosphate (($CH_3$)$_3$$PO_4$, Cas reg. no. 512-56-1); triethyl phosphate (($CH_3CH_2$)$_3$$PO_4$, Cas reg. no. 78-40-0); tributyl phosphate (($C_4H_9$)$_3$$PO_4$, CAS reg. no. 126-73-8); trioctyl phosphate(($C_8H_{17}$)$_3$$PO_4$, CAS reg. no. 1806-54-8); and tri(2-ethylhexyl)phosphate (($CH_3CH(C_2H_5)(CH_2)_4$)$_3$$PO_4$, CAS reg. no. 78-42-2). Representative triaryl phosphates include: triphenyl phosphate (($C_6H_5O$)$_3$PO, CAS reg. no. 115-86-6); tricresyl phosphate (TCP, ($CH_3C_6H_4O$)$_3$PO, CAS reg. no. 1330-78-5); and trixylenyl phosphate ((($CH_3$)$_2$$C_6H_3O$)$_3$PO, CAS reg. no. 25155-23-1). Representative mixed alkyl-aryl phosphates include: isopropylphenyl phenyl phosphate (IPPP, ($C_6H_5O$)$_2$(($CH_3$)$_2$CHO)PO, CAS reg. no. 68782-95-6) and bis(t-butylphenyl)phenyl phosphate (TBPP, ($C_6H_5O$)$_2$(($CH_3$)$_3$C)PO, CAS reg. no. 65652-41-7). Such phosphorus compounds are available from multiple chemical suppliers such as Aldrich (Milwaukee, Wis.); Alfa Aesar (Ward Hill, Mass.); or Akzo Nobel (Arnhem, the Netherlands). Representative commercially available alkylated triaryl phosphates include a butylated triphenyl phosphate, commercially available from Akzo Nobel (Arnhem, the Netherlands) under the trademark Syn-O-Ad® 8784; a tert-butylated triphenyl phosphate commercially available from Great Lakes Chemical Corporation (GLCC, West Lafayette, Ind.) under the trademark Durad® 620; and iso-propylated triphenyl phosphates, also commercially available from GLCC under the trademarks Durad® 220 and 110.

In another embodiment, the stabilizers of the present invention comprise at least one fullerene. Fullerenes are closed carbon cages that are bonded as hexagonal carbon rings (benzene) linked to each other partly via pentagons. The relationship between the number of apices (a, carbon atoms) and hexagon carbon rings (n) (pentagon rings always number 12) is given by: a=2(n+10). While this formula provides for all theoretical structures, only those molecules with relatively low stress and distortion will be stable. Representative fullerenes include but are not limited to Buckminsterfullerene (C60, or "bucky ball", CAS reg. no. [99685-96-8]), and [5,6]fullerene-$C_{70}$ (C70, CAS reg. no. [115383-22-7]), fullerene-$C_{76}$ (CAS reg. no. [135113-15-4]), fullerene-$C_{78}$ (CAS reg. no. [136316-32-0]), and fullerene-$C_{84}$ (CAS reg. no. [135113-16-5]).

In another embodiment, the stabilizers of the present invention comprise at least one aryl alkyl ether. The aryl alkyl ether stabilizers of the present invention may be depicted by Formula C, wherein n is 1, 2 or 3 and $R^1$ is an alkyl group of 1 to 16 carbon atoms.

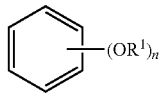

Formula C

Representative aryl alkyl ethers include but are not limited to anisole, 1,4-dimethoxybenzene, 1,4-diethoxybenzene and 1,3,5-trimethoxybenzene.

In another embodiment, the stabilizers of the present invention comprise at least one functionalized perfluoropolyether. Such functionalized perfluoropolyethers may be perfluoropolyether- or perfluoroalkyl-containing and phosphorus-containing partially esterified aryl phosphates, aryl phosphonates and salts thereof, containing either (i) a mono- or poly-alkylene oxide linking group between the phosphorus and a fluorocarbon group, or (ii) no linking group between the phosphorus and fluorocarbon group as described in U.S. Pat. No. 6,184,187, and references therein.

In another embodiment, the functionalized perlfuoropolyether stabilizers may be compounds as represented by Formula C above, which contain either a perfluoroalkyl or perfluoropolyether side chain. Further, the functionalized perfluoropolyether stabilizers may be perfluoropolyether alkyl alcohols comprising a perfluoropolyether segment and one or more alcohols segments having a general formula, —$CH_2(C_qH_{2q})OH$, wherein-$C_qH_{2q}$ represents a divalent linear or branched alkyl radical where q is an integer from 1 to about 10 as described in U.S. patent application Ser. No. 11/156,348, filed Jun. 17, 2005.

In another embodiment, the functionalized perfluoropolyether stabilizers of the present invention may comprise substituted aryl pnictogen compositions having the structure $[R_f^1—(C_rR_{(u+v)})]_mE(O)_n(C_rR^1_{(u+v+1)})_{(3-m)}$, wherein $R_f^1$ is a fluoropolyether chain having a formula weight ranging from about 400 to about 15,000, comprises repeat units, and is selected from the group consisting of:

(a) J-O—$(CF(CF_3)CF_2O)_c(CFXO)_dCFZ$—;
(b) $J^1$-O—$(CF_2CF_2O)_e(CF_2O)_fCFZ^1$—;
(c) $J^2$-O—$(CF(CF_3)CF_2O)_jCF(CF_3)CF_2$—;
(d) $J^3$-O—$(CQ_2$-$CF_2CF_2$—O$)_k$—$CQ_2$-$CF_2$—;
(e) $J^3$-O—$(CF(CF_3)CF_2O)_g(CF_2CF_2O)_h(CFXO)_i$—CFZ—;
(f) $J^4$-O—$(CF_2CF_2O)_rCF_2$—; and
(h) combinations of two or more thereof wherein J is a fluoroalkyl group selected from the group consisting of $CF_3$, $C_2F_5$, $C_3F_7$, $CF_2Cl$, $C_2F_4Cl$, $C_3F_6Cl$, and combinations of two or more thereof;

c and d are numbers such that the ratio of c:d ranges from about 0.01 to about 0.5;

X is F, $CF_3$, or combinations thereof;

Z is F, Cl or $CF_3$;

$J^1$ is a fluoroalkyl group selected from the group consisting of $CF_3$, $C_2F_5$, $C_3F_7$, $CF_2Cl$, $C_2F_4Cl$, and combinations of two or more thereof;

e and f are numbers such that the ratio of e:f ranges from about 0.3 to about 5;

$Z^1$ is F or Cl;

$J^2$ is $C_2F_5$, $C_3F_7$, or combinations thereof;

j is an average number such that the formula weight of $R_f$ ranges from about 400 to about 15,000;

$J^3$ is selected from the group consisting of $CF_3$, $C_2F_5$, $C_3F_7$, and combinations of two or more thereof;

k is an average number such that the formula weight of $R_f$ ranges from about 400 to about 15,000;

each Q is independently F, Cl, or H;

g, h and i are numbers such that (g+h) ranges from about 1 to about 50, the ratio of i:(g+h) ranges from about 0.1 to about 0.5;

$J^4$ is $CF_3$, $C_2F_5$, or combinations thereof;

r is an average number such that the formula weight of $R_f$ ranges from about 400 to about 15,000; and each R and $R^1$ is independently H, a $C_1$-$C_{10}$ alkyl, a halogen, $OR^3$, OH, $SO_3M$, $NR^2_2$, $R^3OH$, $R^3SO_3M$, $R^3NR^2_2$, $R^3NO_2$, $R^3CN$, $C(O)OR^3$, C(O)OM, $C(O)R^3$, or $C(O)NR^2_2$, or combinations of two or more thereof;

wherein $R^2$ is independently H, $C_1$-$C_{10}$ alkyl, or combinations of two or more thereof;

$R^3$ is a $C_1$-$C_{10}$ alkyl; and

M is hydrogen or a metal, preferably not aluminum;

t is equal to (6+u);

u is any combination of 0, 2, 4, 6, 8, 10, 12, 14, 16;

v is independently either 2 or 4;

n is 0 or 1;

E is P, As, or Sb; and m is greater than about 0.5 to about 3, provided that, when E=P, m=3.0 and t=6, R cannot be exclusively H or contain F; as described in U.S. patent application Ser. No. 11/167,330, filed Jun. 27, 2006.

In another embodiment, the functionalized perfluoropolyether stabilizers of the present invention may comprise aryl perfluoropolyethers, which are monofunctional aryl perfluoropolyethers having the formula of $R_f$—$(Y)_a$—$(C_rR_{(u+v)})$—$(O$—$C_rR^1_{(u+v)})_b$—R, difunctional aryl perfluoropolyethers having the formula of $R_f^1$-$[(Y)_a$—$(C_rR_{(u+v)})$—$(O$—$C_rR^1_{(u+v)})_b$—R$]_2$, or combinations thereof, wherein each of $R_f$ and $R_f^1$ has a formula weight of about 400 to about 15,000;

$R_f$ comprises repeat units selected from the group consisting of (a) J-O—$(CF(CF_3)CF_2O)_c(CFXO)_dCFZ$—,
(b) $J^1$-O—$(CF_2CF_2O)_e(CF_2O)_fCFZ^1$—,
(c) $J^2$-O—$(CF(CF_3)CF_2O)_jCF(CF_3)$—,
(d) $J^3$-O—$(CQ_2$-$CF_2CF_2$—O$)_k$—$CQ_2$-,
(e) $J^3$-O—$(CF(CF_3)CF_2O)_g(CF_2CF_2O)_h(CFX$—O$)_i$—CFZ—,
(f) $J^4$-O—$(CF_2CF_2O)_kCF_2$—, and
(g) combinations of two or more thereof; and where the units with formulae $CF_2CF_2O$ and $CF_2O$ are randomly distributed along the chain;

J is $CF_3$, $C_2F_5$, $C_3F_7$, $CF_2Cl$, $C_2F_4Cl$, $C_3F_6Cl$, or combinations of two or more thereof;

c and d are numbers such that the c/d ratio ranges from about 0.01 to about 0.5;

X is —F, —$CF_3$, or combinations thereof;

Z is —F, —Cl or —$CF_3$;

$Z^1$ is —F or —Cl, $J^1$ is $CF_3$, $C_2F_5$, $C_3F_7$, $CF_2Cl$, $C_2F_4Cl$, or combinations of two or more thereof;

e and f are numbers such that the e/f ratio ranges from about 0.3 to about 5;

$J^2$ is —$C_2F_5$, —$C_3F_7$, or combinations thereof;

j is an average number such that the formula weight of $R_f$ ranges from about 400 to about 15,000;

$J^3$ is $CF_3$, $C_2F_5$, $C_3F_7$, or combinations of two or more thereof;

k is an average number such that the formula weight of $R_f$ ranges from about 400 to about 15,000;

each Q is independently —F, —Cl, or —H;

g, h and i are numbers such that (g+h) ranges from about 1 to about 50, the i/(g+h) ratio ranges from about 0.1 to about 0.5;

$J^4$ is $CF_3$, $C_2F_5$, or combinations thereof;

k' is an average number such that the formula weight of $R_f$ ranges from about 400 to about 15,000;

each R is independently —H, a halogen, —OH, —$SO_3M$, —$NR^3{}_2$, —$NO_2$, —$R^4OH$, —$R^4SO_3M$, —$R^4NR^3{}_2$, —$R^4NO_2$, —$R^4CN$, —$C(O)OR^4$, —$C(O)OM$, —$C(O)R^4$, —$C(O)NR^3{}_2$, or combinations of two or more thereof; except that when b=0, R cannot be four hydrogen atoms and —OH, or —Br, or —$NH_2$; or R cannot be solely H or —$NO_2$, or combinations thereof;

each $R^1$ is independently H, —$R^4$, —$OR^4$, a halogen, —OH, —$SO_3M$, —$NR^3{}_2$, —$NO_2$, —CN, —$R^4OH$, —$R^4SO_3M$, —$R^4NR^3{}_2$, —$R^4NO_2$, —$R^4CN$, —$C(O)OR^4$, —$C(O)OM$, —$C(O)R^4$, $C(O)NR^3{}_2$, or combinations of two or more thereof provided that if b=0, the combination of R and $R^2$ cannot be four or more hydrogen atoms and —OH, —Br, —$NH_2$, or —$NO_2$;

each $R^3$ is independently H, $C_1$-$C_{10}$ alkyl, or combinations of two or more thereof;

$R^4$ is a $C_1$-$C_{10}$ alkyl;

M is a hydrogen or metal ion;

a is 0 or 1;

b is 0-5;

Y is a divalent radical —$CH_2OCH_2$—, —$(CH_2)_o$—O—, —$(CF_2)_n$—, —$CF_2O$—, —$CF_2OCF_2$—, —C(O)—, —C(S)—, or combinations of two or more thereof;

n is about 1 to about 5;

o is about 2 to about 5;

t is equal to 6+u;

u is any combination of 0, 2, 4, 6, 8, 10, 12, 14, 16;

v is independently either 2 or 4;

$R_f{}^1$ is —$(CF_2CF_2O)_e(CF_2O)_fCF_2$—, —$(C_3F_6O)_p(CF_2CF_2O)_q(CFXO)_rCF_2$—,
—$(CF_2CF_2O)(C_3F_6O)_wCF(CF_3)$—, —$CF(CF_3)O(C_3F_6O)_w$—$Rf^2$—$O(C_3F_6O)_wCF(CF_3)$—,
—$((CQ_2)CF_2CF_2O)_sCF_2CF_2$—, or combinations of two or more thereof;

where e, f, X, and Q are as defined above;

p, q and r are numbers such that (p+q) ranges from 1 to 50 and r/(p+q) ranges from 0.1 to 0.05;

each w is independently 2 to 45;

$Rf^2$ is linear or branched —$C_mF_{2m}$—;

M is 1-10; and s is an average number such that the formula weight of $R_f{}^1$ ranges from 400 to 15,000, as described in U.S. patent application Ser. No. 11/218,259, filed Sep. 1, 2005.

In another embodiment, the stabilizer may comprise at least one polyoxyalkylated aromatic. The polyoxyalkylated aromatics are compounds represented by Formula C wherein the $R^1$ group is a polyoxyalkylated group comprising at least one —$CH_2CH_2O$— moiety. In another embodiment, the stabilizers of the present invention comprise at least one alkylated aromatic compound. Representative alkylated aromatics include but are not limited to alkylbenzene lubricants, both branched and linear, such as Zerol® 75, Zerol® 150 and Zerol® 500 (linear alkylbenzenes sold by Shrieve Chemicals) and HAB 22 (branched alkylbenzene sold by Nippon Oil).

In another embodiment, the stabilizers of the present invention comprise at least one oxetane. The oxetane stabilizers of the present invention may be a compound with one or more oxetane groups and is represented by Formula D, wherein $R_1$-$R_6$ are the same or different and can be selected from hydrogen, alkyl or substituted alkyl, aryl or substituted aryl.

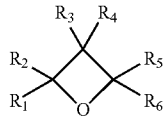

Formula D

Representative oxetane stabilizers include but are not limited to 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); and 3-ethyl-3-((2-ethyl-hexyloxy)methyl)-oxetane, such as OXT-212 (Toagosei Co., Ltd).

In another embodiment, the stabilizers of the present invention comprise ascorbic acid (CAS reg. no. [50-81-7]).

In another embodiment, the stabilizers of the present invention comprise at least one thiol. Thiol compounds, also known as mercaptans or hydrosulfides, are the sulfur analogs of the hydroxyl group containing alcohols. Representative thiol stabilizers include but are not limited to methanethiol(methyl mercaptan), ethanethiol (ethyl mercaptan), Coenzyme A (CAS reg. no. [85-61-0]), dimercaptosuccinic acid (DMSA, CAS reg. no. [2418-14-6]), grapefruit mercaptan ((R)-2-(4-methylcyclohex-3-enyl)propane-2-thiol, CAS reg. no. [83150-78-1]), cysteine ((R)-2-amino-3-sulfanyl-propanoic acid, CAS reg. no. [52-90-4]), and lipoamide (1,2-dithiolane-3-pentanamide, CAS reg. no. [940-69-2].

In another embodiment, the stabilizers of the present invention comprise at least one lactones. Lactones are cyclic esters that may be produced by the reaction of an alcohol group with a carboxylic acid group in the same molecule. Representative lactone stabilizers of the present invention include but are not limited to gamma-butyrolactone (CAS reg. no. [96-48-0]), delta-gluconolactone (CAS reg. no. [90-80-2]), gamma-undecalactone (CAS reg. no. [104-67-6]), 6,7-dihydro-4(5H)-benzofuranone (CAS reg. No. [16806-93-2]), and 5,7-bis(1,1-dimethylethyl)-3-[2,3(or 3,4)-dimethylphenyl]-2(3H)-benzofuranone (CAS reg. no [201815-03-4]) such as Irganox® HP-136 (Ciba).

In another embodiment, the stabilizers of the present invention comprise at least one thioether. Thioether stabilizers of the present invention include but are not limited to benzyl phenyl sulfide (CAS reg. no. [831-91-4]), diphenyl sulfide (CAS reg. no. [139-66-2]), commercially available from Ciba under the trademark Irganox® PS 802 (Ciba) and didodecyl 3,3'-thiopropionate, commercially available from Ciba under the trademark Irganox® PS 800 (Ciba), and mixtures thereof, meaning mixtures of any of the thioethers listed in this paragraph.

In another embodiment, the stabilizers of the present invention comprise at least one amine. In one embodiment the amine stabilizers comprise at least one compound selected from the group consisting of triethylamine, tributylamine, diisopropylamine, triisopropylamine, triisobutylamine, p-phenylenediamine, and diphenylamine. In another embodiment, the amine stabilizers comprise dialkylamines including (N-(1-methylethyl)-2-propylamine, CAS reg. no. [108-18-9]). In another embodiment the amine stabilizers include hindered amine antioxidants. Hindered amine antioxidants include amines derived from substituted piperidine compounds, in particular derivatives of an alkyl-substituted piperidyl, piperidinyl, piperazinone, or alkoxypiperidinyl compounds. Representative hindered amine antioxidants include 2,2,6,6-tetramethyl-4-piperidone; 2,2,6,6-tetramethyl-4-piperidinol; bis-(1,2,2,6,6-pentamethylpiperidyl)sebacate (CAS reg. no. [41556-26-7]); di-(2,2,6,6-tetramethyl-4-piperidyl)sebacate, such as the hindered amine commercially available under the trademark Tinuvin® 770 by Ciba; poly-(N-hydroxyethyl-2,2,6,6-tetramethyl-4-hydroxy-piperidyl succinate (CAS reg. no. [65447-77-0]), such as that commercially available under the trademark Tinuvin® 622LD from Ciba; alkylated para-phenylenediamines, such as N-phenyl-N'-(1,3-dimethylbutyl)-p-phenylenediamine, or N,N'-di-sec-butyl-p-phenylenediamine; and hydroxylamines such as tallow amines or N-methylbis(hydrogenated tallow alkyl)amine. Some other hindered amine antioxidants include the amine antioxidant commercially available from Ciba under the trademark Tinuvin® 765, or commercially available from Mayzo, Inc. under the trademark BLS® 1944 and BLS® 1770. The amines also include mixtures of any of the amines listed in this paragraph.

In another embodiment, the stabilizers of the present invention comprise nitromethane ($CH_3NO_2$, CAS reg. no. [75-52-5]).

In another embodiment, the stabilizers of the present invention comprise at least one alkyl silane. Silanes are compounds similar to hydrocarbons wherein a silicon atom replaces each carbon. Alkyl silane stabilizers include but are not limited to bis(dimethylamino)methylsilane (DMAMS, CAS reg. no. [22705-33-5]), tris(trimethylsilyl)silane (TTMSS, CAS reg. no. [1873-77-4]), vinyltriethyoxysilane (VTES, CAS reg. no. [78-08-0]), and vinyltrimethoxysilane (VTMO, CAS reg. no. [2768-02-7]).

In another embodiment, the stabilizers of the present invention comprise at least one benzophenone derivative. Benzophenone derivative stabilizers comprise benzophenone that may be substituted with side groups including halides, such as fluorine, chlorine, bromine or iodine, amino groups, hydroxyl groups, alkyl groups such as methyl, ethyl or propyl groups, aryl groups such as phenyl, nitro groups, or any combinations of such groups. Representative benzophenone derivative stabilizers include but are not limited to: 2,5-difluorobenzophenone; 2',5'-dihydroxyacetophenone; 2-aminobenzophenone; 2-chlorobenzophenone; 2-fluorobenzophenone; 2-hydroxybenzophenone; 2-methylbenzophenone; 2-amino-4'-chlorobenzophenone; 2-amino-4'-fluorobenzophenone; 2-amino-5-bromo-2'-chlorobenzophenone; 2-amino-5-chlorobenzophenone; 2-amino-5-chloro-2'-fluorobenzophenone; 2-amino-5-nitrobenzophenone; 2-amino-5-nitro-2'-chlorobenzophenone; 2-amino-2',5-dichlorobenzophenone; 2-chloro-4'-fluorobenzophenone; 2-hydroxy-4-methoxybenzophenone; 2-hydroxy-5-chlorobenzophenone; 2-methylamino-5-chlorobenzophenone; 3-methylbenzophenone; 3-nitrobenzophenone; 3-nitro-4'-chloro-4-fluorobenzophenone; 4-chlorobenzophenone; 4-fluorobenzophenone; 4-hydroxybenzophenone; 4-methoxybenzophenone; 4-methylbenzophenone; 4-nitrobenzophenone; 4-phenylbenzophenone; 4-chloro-3-nitrobenzophenone; 4-hydroxy-4'-chlorobenzophenone; 2,4-dihydroxybenzophenone; 2,4-dimethylbenzophenone; 2,5-dimethylbenzophenone; 3,4-diaminobenzophenone; 3,4-dichlorobenzophenone; 3,4-difluorobenzophenone; 3,4-dihydroxybenzophenone; 3,4-dimethylbenzophenone; 4,4'-bis(diethylamine)benzophenone; 4,4'-bis(dimethylamine)benzophenone; 4,4'-dichlorobenzophenone; 4,4'-difluorobenzophenone; 4,4'-dihydroxybenzophenone; and 4,4'-dimethoxybenzophenone.

In another embodiment, the stabilizers of the present invention comprise at least one aryl sulfide. The aryl sulfide stabilizers comprise at least one selected from the group consisting of benzyl phenyl sulfide, diphenyl sulfide, and dibenzyl sulfide.

In another embodiment, the stabilizers of the present invention comprise at least one terephthalate. The terephthalate stabilizers include divinyl terephthalate (CAS reg. no. [13486-19-0]) and diphenyl terephthalate (CAS reg. no. [1539-04-4]).

In one embodiment, the compositions of the present invention further comprising at least one additional stabilizer compound selected from the group consisting of phenols, phosphites, terpenes, terpenoids, and mixtures thereof.

In another embodiment, the additional stabilizer may comprise at least one phenol. Phenol stabilizers comprise any substituted or unsubstituted phenol compound including phenols comprising one or more substituted or unsubstituted cyclic, straight chain, or branched aliphatic substituent group, such as, alkylated monophenols including 2,6-di-tert-butyl-4-methylphenol; 2,6-di-tert-butyl-4-ethylphenol; 2,4-dimethyl-6-tertbutylphenol; tocopherol; and the like, hydroquinone and alkylated hydroquinones including t-butyl hydroquinone, other derivatives of hydroquinone; and the like, hydroxylated thiodiphenyl ethers, including 4,4'-thiobis(2-methyl-6-tert-butylphenol); 4,4'-thiobis(3-methyl-6-tertbutylphenol); 2,2'-thiobis(4methyl-6-tert-butylphenol); and the like, alkylidene-bisphenols including: 4,4'-methylenebis(2,6-di-tert-butylphenol); 4,4'-bis(2,6-di-tert-butylphenol); derivatives of 2,2'- or 4,4-biphenoldiols; 2,2'-methylenebis(4-ethyl-6-tertbutylphenol); 2,2'-methylenebis(4-methyl-6-tertbutylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol; 2,2'-methylenebis(4-methyl-6-cyclohexylphenol, 2,2- or 4,4-biphenyldiols including 2,2'-methylenebis(4-ethyl-6-tert-butylphenol); butylatedhydroxy toluene (BHT), bisphenols comprising heteroatoms including 2,6-di-tert-alpha-dimethylamino-p-cresol, 4,4-thiobis(6-tert-butyl-m-cresol); and the like; acylaminophenols; 2,6-di-tert-butyl-4(N,N'-dimethylaminomethylphenol); sulfides including; bis(3-methyl-4-hydroxy-5-tert-butylbenzyl)sulfide; bis(3,5-di-tert-butyl-4-hydroxybenzyl)sulfide; and mixtures thereof, meaning mixtures of any of the phenol stabilizers listed in this paragraph.

In another embodiment, the additional stabilizer may comprise at least one phosphite. Phosphite stabilizers may be derived from substituted phosphites, including hindered phosphites. In particular, hindered phosphites are derivatives of alkyl, aryl or alkylaryl phosphite compounds. The hindered phosphites include tris-(di-tert-butylphenyl)phosphite, di-n-octyl phosphite, and iso-decyl diphenyl phosphate. Tris-(di-tert-butylphenyl)phosphite is sold under the trademark Irgafos® 168, di-n-octyl phosphite is sold under the trademark Irgafos® OPH, and iso-decyl diphenyl phosphite) is sold under the trademark Irgafos® DDPP, all by Ciba.

In another embodiment, the additional stabilizer may comprise at least one terpene. Terpenes comprise hydrocarbon compounds characterized by structures containing more than one repeating isoprene (2-methyl-1,3-butadiene) unit. Representative terpenes include but are not limited to myrcene (2-methyl-6-methyl-eneocta-1,7-diene), allo-ocimene, beta-ocimene, terebene, limonene (in particular d-limonene), retinal, pinene, menthol, geraniol, farnesol, phytol, Vitamin A, terpinene, delta-3-carene, terpinolene, phellandrene, fenchene, dipentene, and mixtures thereof, meaning mixtures of any of the terpene stabilizers listed in this paragraph. Terpene stabilizers are commercially available or may be prepared by methods known in the art or isolated from natural sources.

In another embodiment, the additional stabilizer may comprise at least one terpenoid. Terpenoids comprise natural products and related compounds characterized by structures containing more than one repeating isoprene unit and usually contain oxygen. Representative terpenoids include carotenoids, such as lycopene (CAS reg. no. [502-65-8]), beta carotene (CAS reg. no. [7235-40-7]), and xanthophylls, i.e. zeaxanthin (CAS reg. no. [144-68-3]); retinoids, such as hepaxanthin (CAS reg. no. [512-39-0]), and isotretinoin (CAS reg. no. [4759-48-2]); abietane (CAS reg. no. [640-43-7]); ambrosane (CAS reg. no. [24749-18-6]); aristolane (CAS reg. no. [29788-49-6]); atisane (CAS reg. no. [24379-83-7]); beyerane (CAS reg. no. [2359-83-3]), bisabolane (CAS reg. no. [29799-19-7]); bornane (CAS reg. no. [464-15-3]); caryophyllane (CAS reg. no. [20479-00-9]); cedrane (CAS reg. no. [13567-54-9]); dammarane (CAS reg. no. [545-22-2]); drimane (CAS reg. no. [5951-58-6]); eremophilane (CAS reg. no. [3242-05-5]); eudesmane (CAS reg. no. [473-11-0]); fenchane (CAS reg. no. [6248-88-0]); gammacerane (CAS reg. no. [559-65-9]); germacrane (CAS reg. no. [645-10-3]); gibbane (CAS reg. no. [6902-95-0]); grayanotoxane (CAS reg. no. [39907-73-8]); guaiane (CAS reg. no. [489-80-5]); himachalane (CAS reg. no. [20479-45-2]); hopane (CAS reg. no. [471-62-5]); humulane (CAS reg. no. [430-19-3]); kaurane (CAS reg. no. [1573-40-6]); labdane (CAS reg. no. [561-90-0]); lanostane (CAS reg. no. [474-20-4]); lupane (CAS reg. no. [464-99-3]); p-menthane (CAS reg. no. [99-82-1]); oleanane (CAS reg. no. [471-67-0]); ophiobolane (CAS reg. no. [20098-65-1]); picrasane (CAS reg. no. [35732-97-9]); pimarane (CAS reg. no. [30257-03-5]); pinane (CAS reg. no. [473-55-2]); podocarpane (CAS reg. no. [471-78-3]); protostane (CAS reg. no. [70050-78-1]); rosane (CAS reg. no. [6812-82-4]); taxane (CAS reg. no. [1605-68-1]); thujane (CAS reg. no. [471-12-5]); trichothecane (CAS reg. no. [24706-08-9]), ursane (CAS reg. no. [464-93-7]), and mixtures thereof, meaning mixtures of any of the terpenoids listed in this paragraphs. The terpenoids of the present invention are commercially available or may be prepared by methods known in the art or may be isolated from the naturally occurring source.

Unless otherwise noted above, the stabilizers of the present invention are commercially available from various chemical supply houses.

Single stabilizer compounds may be used in combination in the present compositions comprising at least one fluoroolefin or multiple stabilizer compounds may be combined in any proportion to serve as a stabilizer blend. The stabilizer blend may contain multiple stabilizer compounds from the same class of compounds or multiple stabilizer compounds from different classes of compounds. For example, a stabilizer blend may contain 2 or more thiophosphates, or one or more thiophosphate in combination with one or more lactones.

Additionally, some of the stabilizer compounds exist as multiple configurational isomers or stereoisomers. Single isomers or multiple isomers of the same compound may be used in any proportion to prepare the stabilizer blend. Further, single or multiple isomers of a given compound may be combined in any proportion with any number of other compounds to serve as a stabilizer blend. The present invention is intended to include all single configurational isomers, single stereoisomers or any combination or mixture thereof.

The present invention further provides a composition comprising at least one fluoroolefin selected from the group consisting of HFC-1225ye, HFC-1234yf, HFC-1234ze and HFC-1243zf, and an effective amount of a stabilizer comprising at least one epoxide, fluorinated expoxide or mixtures thereof.

Of particular note are stabilizer compositions comprising combinations of compounds that provide an unexpected level of stabilization. Certain of these combinations may serve as synergistic stabilizer compositions, that is, the compositions of compounds that augment each others' efficiency in a formulation and the stabilization obtained is larger than that expected from the sum of the contributions of the individual components. Such synergistic stabilizer compositions may comprise at least one phosphorus-containing compound and any of the additional compounds selected from the group consisting of terpenes and terpenoids, fullerenes, epoxides, fluorinated epoxides, oxetanes, divinylterephthalate, and diphenylterephthalate, and mixtures thereof, meaning mixtures of any of the foregoing additional compounds with a phosphorus-containing compound.

A limiting factor in the effectiveness of a stabilizer composition is the consumption of stabilizer and loss of functionality over the time of active use. Of particular note are synergistic stabilizer compositions comprising mixtures of stabilizers that include components capable of regenerating the consumed stabilizer during active use, hereinafter referred to as regenerative stabilizers. Unlike multi-functional single, large stabilizer compounds comprising multiple stabilizing functional groups, regenerative stabilizers comprising small "synergistic" stabilizers function with higher mobility and higher stabilization rates (meaning higher rates of reaction by which the stabilization is occurring). Regenerative stabilizer composition contains one or more stabilizers that can replenish itself or themselves after use, so that over long-term use, the composition's efficacy is maintained.

An example of a regenerative stabilizer is at least one epoxide or fluorinated epoxide and at least one amine. Amines for inclusion in the regenerative stabilizer compositions may comprise any of the hindered amine antioxidants as described previously herein. Of particular note, are those hindered amines derived from substituted piperidine compounds, in particular derivatives of an alkyl-substituted piperidyl, piperidinyl, piperazinone, or alkoxypiperidinyl compounds, and mixtures thereof. Representative hindered amine antioxidants are 2,2,6,6-tetramethyl-4-piperidone; 2,2,6,6-tetramethyl-4-piperidinol; bis-(1,2,2,6,6-pentamethylpiperidyl) sebacate (CAS reg. no. [41556-26-7]); di-(2,2, 6,6-tetramethyl-4-piperidyl)sebacate, such as the hindered amine commercially available under the trademark Tinuvin® 770 by Ciba; poly-(N-hydroxyethyl-2,2,6,6-tetramethyl-4-hydroxy-piperidyl succinate (CAS reg. no. [65447-77-0]), such as that commercially available under the trademark Tinuvin® 622LD from Ciba; alkylated paraphenylenediamines, such as N-phenyl-N'-(1,3-dimethylbutyl)-p-phenylenediamine, or N,N'-di-sec-butyl-p-phenylenediamine; and hydroxylamines such as tallow amines or N-methylbis(hydrogenated tallow alkyl)amine. Some other hindered amine antioxidants include the amine antioxidant commercially available from Ciba under the trademark Tinuvin® 765, or commercially available from Mayzo, Inc.

under the trademark BLS® 1944 and BLS® 1770. The amines also include mixtures of any of the amines listed in this paragraph.

Another example of regenerative stabilizer is a stabilizer which comprises at least one epoxide or fluorinated epoxide, combined with at least one phosphite. Of particular note are phosphites, which can be derived from substituted phosphites in particular, derivatives of alky, aryl phosphite compounds. Representative phosphites which can be used for regenerative stabilizers include (tris-(di-tert-butylphenyl) phosphite), sold under the trademark Irgafos® 168, (di-n-octyl phosphite), sold under the trademark Irgafos® OPH and (Iso-decyl diphenyl phosphite), sold under the trademark Irgafos® DDPP (all from Ciba).

In another embodiment, any stabilizer composition as described above herein may further comprise at least one metal deactivator selected from the group consisting of areoxalyl bis(benzylidene)hydrazide (CAS reg. no. 6629-10-3); N,N'-bis(3,5-di-tert-butyl-4-hydroxyhydrocinnamoylhydrazine) (CAS reg. no. 32687-78-8); 2,2'-oxamidobis-ethyl-(3,5-d-tert-butyl-4-hydroxyhydorcinnamate) (CAS reg. no. 70331-94-1); N,N'-(disalicyclidene)-1,2-propanediamine (CAS reg. no. 94-91-1); ethyenediaminetetraacetic acid (CAS reg. no. 60-00-4) and salts thereof; triazoles; benzotriazole, 2-mercaptobenzothiazole, tolutriazole derivatives, N,N-disalicylidene-1,2-diaminopropane, and mixtures thereof.

In another embodiment, the present disclosure provides a composition comprising a. at least one fluoroolefin; and b. an effective amount of a stabilizer comprising i) at least one epoxide, fluorinated epoxide or mixture thereof; ii) at least one phosphite, phenol, terpene, terpenoid, or mixture thereof; and iii) at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamidobis-ethyl-(3,5-d-tert-butyl-4-hydroxyhydorcinnamate); N,N'-(disalicyclidene)-1,2-propanediamine; ethyenediaminetetraacetic acid and salts thereof; triazoles; benzotriazole, 2-mercaptobenzothiazole, tolutriazole derivatives, N,N-disalicylidene-1,2-diaminopropane, and mixtures thereof. Phosphites suitable for inclusion in the above mentioned compositions may be hindered phosphites derived from substituted phosphites. In particular, hindered phosphites are derivatives of alkyl, aryl or alkylaryl phosphite compounds. Representative hindered phosphites are Irgafos 168 (Tris-(di-tert-butylphenyl)phosphite), Irgafos OPH (Di-n-octyl phosphite), and Irgafos DDPP (Iso-decyl diphenyl phosphite) (all from Ciba). Phenols suitable for inclusion in the above mentioned compositions may be any substituted or unsubstituted phenol compound including phenols comprising one or more substituted or unsubstituted cyclic, straight chain, or branched aliphatic substituent group, such as, alkylated monophenols including 2,6-di-tert-butyl-4-methylphenol; 2,6-di-tert-butyl-4-ethylphenol; 2,4-dimethyl-6-tertbutylphenol; tocopherol; and the like, hydroquinone and alkylated hydroquinones including t-butyl hydroquinone, other derivatives of hydroquinone; and the like, hydroxylated thiodiphenyl ethers, including 4,4'-thio-bis(2-methyl-6-tert-butylphenol); 4,4'-thiobis(3-methyl-6-tertbutylphenol); 2,2'-thiobis(4-methyl-6-tert-butylphenol); and the like, alkylidene-bisphenols including: 4,4'-methylenebis(2,6-di-tert-butylphenol); 4,4'-bis(2,6-di-tert-butylphenol); derivatives of 2,2'- or 4,4-biphenoldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol; 2,2'-methylenebis(4-methyl-6-cyclohexylphenol, 2,2- or 4,4-biphenyldiols including 2,2'-methylenebis(4-ethyl-6-tert-butylphenol); butylated hydroxyl toluene (BHT), bisphenols comprising heteroatoms including 2,6-di-tert-alpha-dimethylamino-p-cresol, 4,4-thiobis(6-tert-butyl-m-cresol); and the like; acylaminophenols; 2,6-di-tert-butyl-4(N,N'-dimethylaminomethylphenol); sulfides including; bis(3-methyl-4-hydroxy-5-tert-butylbenzyl)sulfide; bis(3,5-di-tert-butyl-4-hydroxybenzyl)sulfide; and the like. Terpenes suitable for inclusion in the above mentioned compositions are hydrocarbon compounds characterized by structures containing one or more repeating isoprene (2-methyl-1,3-butadiene) unit. Terpenes may be acyclic or cyclic. Representative terpenes include but are not limited to isoprene, myrcene (2-methyl-6-methyl-eneocta-1,7-diene), allo-cimene, beta-ocimene, terebene, limonene (in particular d-limonene), retinal, pinene, menthol, geraniol, farnesol, phytol, Vitamin A, terpinene, delta-3-carene, terpinolene, phellandrene, fenchene, dipentene, and mixtures thereof. Terpene stabilizers are commercially available or may be prepared by methods known in the art or isolated from natural sources. Terpenoids suitable for inclusion in the above mentioned compositions are natural products and related compounds characterized by structures containing more than one repeating isoprene unit and usually contain oxygen. Representative terpenoids include carotenoids, such as lycopene (CAS reg. no. [502-65-8]), betacarotene (CAS reg. no. [7235-40-7]), and xanthophylls, i.e. zeaxanthin (CAS reg. no. [144-68-3]); retinoids, such as hepaxanthin (CAS reg. no. [512-39-0]), and isotretinoin (CAS reg. no. [4759-48-2]); abietane (CAS reg. no. [640-43-7]); ambrosane (CAS reg. no. [24749-18-6]); aristolane (CAS reg. no. [29788-49-6]); atisane (CAS reg. no. [24379-83-7]); beyerane (CAS reg. no. [2359-83-3]), bisabolane (CAS reg. no. [29799-19-7]); bornane (CAS reg. no. [464-15-3]); caryophyllane (CAS reg. no. [20479-00-9]); cedrane (CAS reg. no. [13567-54-9]); dammarane (CAS reg. no. [545-22-2]); drimane (CAS reg. no. [5951-58-6]); eremophilane (CAS reg. no. [3242-05-5]); eudesmane (CAS reg. no. [473-11-0]); fenchane (CAS reg. no. [6248-88-0]); gammacerane (CAS reg. no. [559-65-9]); germacrane (CAS reg. no. [645-10-3]); gibbane (CAS reg. no. [6902-95-0]); grayanotoxane (CAS reg. no. [39907-73-8]); guaiane (CAS reg. no. [489-80-5]); himachalane (CAS reg. no. [20479-45-2]); hopane (CAS reg. no. [471-62-5]); humulane (CAS reg. no. [430-19-3]); kaurane (CAS reg. no. [1573-40-6]); labdane (CAS reg. no. [561-90-0]); lanostane (CAS reg. no. [474-20-4]); lupane (CAS reg. no. [464-99-3]); p-menthane (CAS reg. no. [99-82-1]); oleanane (CAS reg. no. [471-67-0]); ophiobolane (CAS reg. no. [20098-65-1]); picrasane (CAS reg. no. [35732-97-9]); pimarane (CAS reg. no. [30257-03-5]); pinane (CAS reg. no. [473-55-2]); podocarpane (CAS reg. no. [471-78-3]); protostane (CAS reg. no. [70050-78-1]); rosane (CAS reg. no. [6812-82-4]); taxane (CAS reg. no. [1605-68-1]); thujane (CAS reg. no. [471-12-5]); trichothecane (CAS reg. no. [24706-08-9]); and ursane (CAS reg. no. [464-93-7]). The terpenoids of the present invention may be prepared by methods known in the art or may be isolated from the naturally occurring source.

The compositions of the present invention may further comprise at least one additional compound selected from the group consisting of fluoroolefins (as described previously herein), hydrofluorocarbons, hydrocarbons, dimethyl ether, $CF_3I$, carbon dioxide ($CO_2$), ammonia, and mixtures thereof.

In one embodiment, additional compounds comprise at least one hydrofluorocarbon (HFC) compound. Hydrofluorocarbons of the present invention comprise saturated compounds containing carbon, hydrogen, and fluorine. Of particular utility are hydrofluorocarbons having 1-7 carbon atoms and having a normal boiling point of from about −90° C. to about 80° C. Hydrofluorocarbons are commercial products available from a number of sources such as E. I. du Pont de Nemours & Co., Fluoroproducts, Wilmington, Del., 19898, USA, or may be prepared by methods known in the art. Representative hydrofluorocarbon compounds include but are not limited to fluoromethane ($CH_3F$, HFC-41), difluoromethane ($CH_2F_2$, HFC-32), trifluoromethane ($CHF_3$, HFC-23), pentafluoroethane ($CF_3CHF_2$, HFC-125), 1,1,2,2-tetrafluoroethane ($CHF_2CHF_2$, HFC-134), 1,1,1,2-tetrafluoroethane ($CF_3CH_2F$, HFC-134a), 1,1,1-trifluoroethane ($CF_3CH_3$, HFC-143a), 1,1-difluoroethane ($CHF_2CH_3$, HFC-152a), fluoroethane ($CH_3CH_2F$, HFC-161), 1,1,1,2,2,3,3-heptafluoropropane ($CF_3CF_2CHF_2$, HFC-227ca), 1,1,1,2,3,3,3-heptafluoropropane ($CF_3CHFCF_3$, HFC-227ea), 1,1,2,2,3,3,-hexafluoropropane ($CHF_2CF_2CHF_2$, HFC-236ca), 1,1,1,2,2,3-hexafluoropropane ($CF_3CF_2CH_2F$, HFC-236cb), 1,1,1,2,3,3-hexafluoropropane ($CF_3CHFCHF_2$, HFC-236ea), 1,1,1,3,3,3-hexafluoropropane ($CF_3CH_2CF_3$, HFC-236fa), 1,1,2,2,3-pentafluoropropane ($CHF_2CF_2CH_2F$, HFC-245ca), 1,1,1,2,2-pentafluoropropane ($CF_3CF_2CH_3$, HFC-245cb), 1,1,2,3,3-pentafluoropropane ($CHF_2CHFCHF_2$, HFC-245ea), 1,1,1,2,3-pentafluoropropane ($CF_3CHFCH_2F$, HFC-245eb), 1,1,1,3,3-pentafluoropropane ($CF_3CH_2CHF_2$, HFC-245fa), 1,2,2,3-tetrafluoropropane ($CH_2FCF_2CH_2F$, HFC-254ca), 1,1,2,2-tetrafluoropropane ($CHF_2CF_2CH_3$, HFC-254cb), 1,1,2,3-tetrafluoropropane ($CHF_2CHFCH_2F$, HFC-254ea), 1,1,1,2-tetrafluoropropane ($CF_3CHFCH_3$, HFC-254eb), 1,1,3,3-tetrafluoropropane ($CHF_2CH_2CHF_2$, HFC-254fa), 1,1,1,3-tetrafluoropropane ($CF_3CH_2CH_2F$, HFC-254fb), 1,1,1-trifluoropropane ($CF_3CH_2CH_3$, HFC-263fb), 2,2-difluoropropane ($CH_3CF_2CH_3$, HFC-272ca), 1,2-difluoropropane ($CH_2FCHFCH_3$, HFC-272ea), 1,3-difluoropropane ($CH_2FCH_2CH_2F$, HFC-272fa), 1,1-difluoropropane ($CHF_2CH_2CH_3$, HFC-272fb), 2-fluoropropane ($CH_3CHFCH_3$, HFC-281ea), 1-fluoropropane ($CH_2FCH_2CH_3$, HFC-281fa), 1,1,2,2,3,3,4,4-octafluorobutane ($CHF_2CF_2CF_2CHF_2$, HFC-338pcc), 1,1,1,2,2,4,4,4-octafluorobutane ($CF_3CH_2CF_2CF_3$, HFC-338mf), 1,1,1,3,3-pentafluorobutane ($CF_3CH_2CHF_2$, HFC-365mfc), 1,1,1,2,3,4,4,5,5,5-decafluoropentane ($CF_3CHFCHFCF_2CF_3$, HFC-43-10mee), and 1,1,1,2,2,3,4,5,5,6,6,7,7,7-tetradecafluoroheptane ($CF_3CF_2CHFCHFCF_2CF_2CF_3$, HFC-63-14mee).

In another embodiment, additional compounds comprise at least one hydrocarbon. The hydrocarbons of the present invention comprise compounds having only carbon and hydrogen. Of particular utility are compounds having 3-7 carbon atoms. Hydrocarbons are commercially available through numerous chemical suppliers. Representative hydrocarbons include but are not limited to propane, n-butane, isobutane, cyclobutane, n-pentane, 2-methylbutane, 2,2-dimethylpropane, cyclopentane, n-hexane, 2-methylpentane, 2,2-dimethylbutane, 2,3-dimethylbutane, 3-methylpentane, cyclohexane, n-heptane, and cycloheptane.

In another embodiment, additional compounds may also comprise hydrocarbons containing heteroatoms, such as dimethylether (DME, $CH_3OCH_3$. DME is commercially available.

In another embodiment, additional compounds may also comprise iodotrifluoromethane ($CF_3I$), which is commercially available from various sources or may be prepared by methods known in the art.

In another embodiment, additional compounds may also comprise carbon dioxide ($CO_2$), which is commercially available from various sources or may be prepared by methods known in the art.

In another embodiment, additional compounds may also comprise ammonia ($NH_3$), which is commercially available from various sources or may be prepared by methods known in the art.

In another embodiment, of particular note are additional compounds including compositions comprising: HFC-1225ye and HFC-32; HFC-1225ye and HFC-134a; HFC-1225ye, HFC-134a, and HFC-32; HFC-1225ye and HFC-1234yf; HFC-1225ye, HFC-1234yf, and HFC-32; and HFC-1225ye, HFC-1234yf and HFC-125.

In another embodiment, additional compounds include compositions comprising fluoroolefins as disclosed in U.S. patent application Ser. No. 11/369,227 filed Mar. 2, 2006; U.S. patent application Ser. No. 11/393,109 filed Mar. 30, 2006; and U.S. patent application Ser. No. 11/486,791 filed Jul. 13, 2006; are intended to be included within the scope of the present invention.

The compositions of the present invention may further comprise at least one lubricant. Lubricants of the present invention comprise those suitable for use with refrigeration or air-conditioning apparatus. Among these lubricants are those conventionally used in compression refrigeration apparatus utilizing chlorofluorocarbon refrigerants. Such lubricants and their properties are discussed in the 1990 ASHRAE Handbook, Refrigeration Systems and Applications, chapter 8, titled "Lubricants in Refrigeration Systems", pages 8.1 through 8.21, herein incorporated by reference. Lubricants of the present invention may comprise those commonly known as "mineral oils" in the field of compression refrigeration lubrication. Mineral oils comprise paraffins (i.e. straight-chain and branched-carbon-chain, saturated hydrocarbons), naphthenes (i.e. cyclic or ring structure saturated hydrocarbons, which may be paraffins) and aromatics (i.e. unsaturated, cyclic hydrocarbons containing one or more rings characterized by alternating double bonds). Lubricants of the present invention further comprise those commonly known as "synthetic oils" in the field of compression refrigeration lubrication. Synthetic oils comprise alkylaryls (i.e. linear and branched alkyl alkylbenzenes), synthetic paraffins and naphthenes, silicones, and polyalphaolefins. Representative conventional lubricants of the present invention are the commercially available BVM 100 N (paraffinic mineral oil sold by BVA Oils), napthenic mineral oil commercially available under the trademark from Suniso® 3GS and Suniso® 5GS by Crompton Co., naphthenic mineral oil commercially available from Pennzoil under the trademark Sontex® 372LT, naphthenic mineral oil commercially available from Calumet Lubricants under the trademark Calumet® RO-30, linear alkylbenzenes commercially available from Shrieve Chemicals under the trademarks Zerol® 75, Zerol® 150 and Zerol® 500 and branched alkylbenzene, sold by Nippon Oil as HAB 22.

Lubricants of the present invention further comprise those which have been designed for use with hydrofluorocarbon refrigerants and are miscible with refrigerants of the present invention under compression refrigeration and air-conditioning apparatus' operating conditions. Such lubricants and their properties are discussed in "Synthetic Lubricants and High-Performance Fluids", R. L. Shubkin, editor, Marcel Dekker, 1993, Chapters 2 and 4. Such lubricants include, but are not limited to, polyol esters (POEs) such as Castrol® 100 (Castrol, United Kingdom), polyalkylene glycols (PAGs)

such as RL-488A from Dow (Dow Chemical, Midland, Mich.), and polyvinyl ethers (PVEs).

Lubricants of the present invention are selected by considering a given compressor's requirements and the environment to which the lubricant will be exposed.

The compositions of the present invention that may be prepared by any convenient method to combine the desired amount of the individual components. A preferred method is to weigh the desired component amounts and thereafter combine the components in an appropriate vessel. Agitation may be used, if desired.

Any suitable effective amount of stabilizer may be used in the compositions comprising at least one fluoroolefin. As described herein, the phrase "effective amount" refers to an amount of stabilizer of the present invention which, when added to a composition comprising at least one fluoroolefin, results in a composition that will not degrade to produce as great a reduction in refrigeration performance when in use in a cooling apparatus as compared to the composition without stabilizer. Such effective amounts of stabilizer may be determined by way of testing under the conditions of standard test ASHRAE 97-2004. In a certain embodiment of the present invention, an effective amount may be said to be that amount of stabilizer that when combined with a composition comprising at least one fluoroolefin allows a cooling apparatus utilizing said composition comprising at least one fluoroolefin to perform at the same level of refrigeration performance and cooling capacity as if a composition comprising 1,1,1,2-tetrafluoroethane (R-134a), or other standard refrigerant (R12, R22, R502, R507A, R508, R401A, R401B, R402A, R402B, R408, R410A, R404A, R407C, R413A, R417A, R422A, R422B, R422C, R422D, R423, R114, R11, R113, R123, R124, R236fa, or R245fa) depending upon what refrigerant may have been used in a similar system in the past, were being utilized as the working fluid.

Certain embodiments include effective amounts of stabilizer for use in the present invention that comprise from about 0.001 weight percent to about 10 weight percent, more preferably from about 0.01 weight percent to about 5 weight percent, even more preferably from about 0.3 weight percent to about 4 weight percent and even more preferably from about 0.3 weight percent to about 1 weight percent based on the total weight of compositions comprising at least one fluoroolefin as described herein.

The present invention further relates to a method for stabilizing a composition comprising at least one fluoroolefin, said method comprising adding an effective amount of a stabilizer comprising: a. at least one epoxide or fluorinated epoxide; and b. at least one compound selected from the group consisting of thiophosphates, butylated triphenylphosphorothionates, organophosphates, fullerenes, functionalized perfluoropolyethers, polyoxyalkylated aromatics, alkylated aromatics, oxetanes, ascorbic acid, thiols, lactones, thioethers, amines, nitromethane, alkylsilanes, benzophenone derivatives, aryl sulfides, divinyl terephthalate, diphenyl terephthalate, and mixtures thereof.

The present invention further relates to a process for producing cooling comprising condensing a composition comprising at least one fluoroolefin and an effective amount of a stabilizer comprising: a. at least one epoxide or fluorinated epoxide; and b. at least one compound selected from the group consisting of thiophosphates, butylated triphenylphosphorothionates, organophosphates, fullerenes, functionalized perfluoropolyethers, polyoxyalkylated aromatics, alkylated aromatics, oxetanes, ascorbic acid, thiols, lactones, thioethers, amines, nitromethane, alkylsilanes, benzophenone derivatives, aryl sulfides, divinyl terephthalate, diphenyl terephthalate, and mixtures thereof, and thereafter evaporating said composition in the vicinity of a body to be cooled.

A body to be cooled may be any space, location or object requiring refrigeration or air-conditioning. In stationary applications the body may be the interior of a structure, i.e. residential or commercial, or a storage location for perishables, such as food or pharmaceuticals. For mobile refrigeration applications the body may be incorporated into a transportation unit for the road, rail, sea or air. Certain refrigeration systems operate independently with regards to any moving carrier, these are known as "intermodal" systems. Such intermodal systems include "containers" (combined sea/land transport) as well as "swap bodies" (combined road and rail transport).

The present invention further relates to a process for producing heat comprising condensing a composition comprising at least one fluoroolefin and an effective amount of a stabilizer comprising: a. at least one epoxide or fluorinated epoxide; and b. at least one compound selected from the group consisting of thiophosphates, butylated triphenylphosphorothionates, organophosphates, fullerenes, functionalized perfluoropolyethers, polyoxyalkylated aromatics, alkylated aromatics, oxetanes, ascorbic acid, thiols, lactones, thioethers, amines, nitromethane, alkylsilanes, benzophenone derivatives, aryl sulfides, divinyl terephthalate, diphenyl terephthalate, and mixtures thereof in the vicinity of a body to be heated, and thereafter evaporating said composition.

A body to be heated may be any space, location or object requiring heat. These may be the interior of structures either residential or commercial in a similar manner to the body to be cooled. Additionally, mobile units as described for cooling may be similar to those requiring heating. Certain transport units require heating to prevent the material being transported from solidifying inside the transport container.

It is not uncommon for air to leak into a refrigeration, air-conditioning system or heat pump. The oxygen in the air may lead to oxidation of certain components of the system including the working fluid. Thus, in another embodiment, also disclosed is a method for reducing degradation of a composition comprising at least one fluoroolefin, wherein said degradation is caused by the presence of inadvertent air; for example in a refrigeration, air-conditioning or heat pump system, said method comprising adding an effective amount of a stabilizer comprising at least one epoxide or fluorinated epoxide and at least one compound selected from the group consisting of thiophosphates, butylated triphenylphosphorothionates, organo phosphates, fullerenes, functionalized perfluoropolyethers, polyoxyalkylated aromatics, alkylated aromatics, oxetanes, ascorbic acid, thiols, lactones, thioethers, amines, nitromethane, alkylsilanes, benzophenone derivatives, aryl sulfides, divinyl terephthalate, diphenyl terephthalate, and mixtures thereof to the composition comprising at least one fluoroolefin.

In another embodiment, also disclosed is a method for reducing reaction with oxygen for a composition comprising at least one fluoroolefins, said method comprising adding an effective amount of a stabilizer comprising at least one epoxide or fluorinated epoxide and at least one compound selected from the group consisting of thiophosphates, butylated triphenylphosphorothionates, organo phosphates, fullerenes, functionalized perfluoropolyethers, polyoxyalkylated aromatics, alkylated aromatics, oxetanes, ascorbic acid, thiols, lactones, thioethers, amines, nitromethane, alkylsilanes, benzophenone derivatives, aryl sulfides, divinyl terephthalate, diphenyl terephthalate, and mixtures thereof to the composition comprising at least one fluoroolefin.

Example 5

Refrigeration System Chemical Stability

A chemical stability test is run under conditions described in ASHRAE (American Society of Heating, Refrigerating and Air-Conditioning Engineers) Standard 97-2004 to determine chemical stability of the stabilized compositions of the present invention as compared to compositions with no stabilizers.

The procedure is given here:
1. Metal coupons of copper, aluminum and steel are placed in thick walled glass tubes.
2. Working fluid samples, including lubricant, are prepared with and without stabilizers, and optionally with 2 volume % air added to the tube.
3. Samples are added to the glass tubes as described in the standard.
4. The tubes are sealed with a glass blowing torch.
5. The sealed tubes are heated in an oven for 14 days at the specified temperature.
6. After 14 days, the sealed tubes are removed from the oven and examined for metal/liquid appearance, proper volume of liquid, appearance of glass, and absence of extraneous materials such as metal fines.
7. Ratings are assigned to each sample based upon the following criteria (per industry practice):

1=light changes on coupons and liquids;
2=light to moderate changes on coupons or liquids;
3=moderate to significant changes on coupons or liquids;
4=severe changes on coupons or liquids;
5=extreme changes on coupons or liquids, i.e. black liquid or coked with many deposits.

Table 4 lists estimated results for stabilizers of the present invention as compared to unstabilized compositions. Ucon® PAG 488 is a trademark for a polyalkylene glycol lubricant commercially available from The Dow Chemical Company. Irgalube® 63 is a trademark for a dithiophosphate commercially available from Ciba. Irgalube® 232 is a trademark for a butylated triphenyl phosphorothionate commercially available from Ciba. Irgalube® 349 is a trademark for a mixture of amine phosphates (an example of an organophosphate) commercially available from Ciba. Irgalube® 350 and Irgalube® 353 are trademarks for dialkyl dithiophosphate esters from Ciba. Krytox®157FSL is a trademark for a functionalized perfluoropolyether commercially available from DuPont. Zerol® 150 is a trademark for an alkyl benzene lubricant sold by Shrieve Chemical. OXT-101 is 3-ethyl-3-hydroxymethyloxetane from Toagosei Company. Tinuvin® 622LD is a trademark for a hindered amine antioxidant commercially available from Ciba. HP-136 is 5,7-di-t-butyl-3-(3-4-dimethylphenyl)-3H-benzofuran-2-one (an example of a lactone) from Ciba. The lubricant Ucon® PAG 488 is combined with the working fluid as set forth in Table 4 below to produce a composition that was 50 wt % working fluid and 50 wt % lubricant.

TABLE 4

| Working fluid | Lubricant | Stabilizer | Stabilizer (wt % in refrig/lubricant mixture) | With 2 vol % Air | Temp (° C.) | Rating |
|---|---|---|---|---|---|---|
| HFC-1225ye | PAG 488 | None | 0 | yes | 175 | 4 |
| HFC-1225ye | PAG 488 | None | 0 | no | 175 | 2 |
| HFC-1225ye | PAG 488 | Irgalube ® 63 | 2 | yes | 175 | 2 |
| HFC-1225ye | PAG 488 | Irgalube ® 63 | 2 | no | 175 | 1 |
| HFC-1225ye | PAG 488 | Irgalube ® 232 | 2 | yes | 175 | 2 |
| HFC-1225ye | PAG 488 | Irgalube ® 232 | 2 | no | 175 | 1 |
| HFC-1225ye | PAG 488 | Irgalube ® 349 | 2 | yes | 175 | 2 |
| HFC-1225ye | PAG 488 | Irgalube ® 349 | 2 | no | 175 | 1 |
| HFC-1225ye | PAG 488 | Irgalube ® 350 | 2 | yes | 175 | 2 |
| HFC-1225ye | PAG 488 | Irgalube ® 350 | 2 | no | 175 | 1 |
| HFC-1225ye | PAG 488 | Irgalube ® 353 | 2 | yes | 175 | 2 |
| HFC-1225ye | PAG 488 | Irgalube ® 353 | 2 | no | 175 | 1 |
| HFC-1225ye | PAG 488 | d-limonene | 2 | yes | 175 | 2 |
| HFC-1225ye | PAG 488 | d-limonene | 2 | no | 175 | 1 |
| HFC-1225ye | PAG 488 | buckminsterfullerene | 2 | yes | 175 | 2 |
| HFC-1225ye | PAG 488 | buckminsterfullerene | 2 | no | 175 | 1 |
| HFC-1225ye | PAG 488 | graphite powder | 2 | yes | 175 | 2 |
| HFC-1225ye | PAG 488 | graphite powder | 2 | no | 175 | 1 |
| HFC-1225ye | PAG 488 | naphthalene | 2 | yes | 175 | 2 |
| HFC-1225ye | PAG 488 | naphthalene | 2 | no | 175 | 1 |
| HFC-1225ye | PAG 488 | Anisole | 2 | yes | 175 | 2 |
| HFC-1225ye | PAG 488 | Anisole | 2 | no | 175 | 1 |
| HFC-1225ye | PAG 488 | Krytox ® 157FSL | 2 | yes | 175 | 2 |
| HFC-1225ye | PAG 488 | Krytox ® 157FSL | 2 | no | 175 | 1 |
| HFC-1225ye | PAG 488 | Zerol ® 150 | 2 | yes | 175 | 2 |
| HFC-1225ye | PAG 488 | Zerol ® 150 | 2 | no | 175 | 1 |
| HFC-1225ye | PAG 488 | Trifluormethyloxirane | 2 | yes | 175 | 2 |
| HFC-1225ye | PAG 488 | Trifluormethyloxirane | 2 | no | 175 | 1 |
| HFC-1225ye | PAG 488 | OXT-101 | 2 | yes | 175 | 2 |
| HFC-1225ye | PAG 488 | OXT-101 | 2 | no | 175 | 1 |
| HFC-1225ye | PAG 488 | ascorbic acid | 2 | yes | 175 | 2 |
| HFC-1225ye | PAG 488 | ascorbic acid | 2 | no | 175 | 1 |
| HFC-1225ye | PAG 488 | methyl mercaptan | 2 | yes | 175 | 2 |
| HFC-1225ye | PAG 488 | methyl mercaptan | 2 | no | 175 | 1 |

TABLE 4-continued

| Working fluid | Lubricant | Stabilizer | Stabilizer (wt % in refrig/lubricant mixture) | With 2 vol % Air | Temp (° C.) | Rating |
|---|---|---|---|---|---|---|
| HFC-1225ye | PAG 488 | gamma-undecalactone | 2 | yes | 175 | 2 |
| HFC-1225ye | PAG 488 | gamma-undecalactone | 2 | no | 175 | 1 |
| HFC-1225ye | PAG 488 | benzyl phenyl sulfide | 2 | yes | 175 | 2 |
| HFC-1225ye | PAG 488 | benzyl phenyl sulfide | 2 | no | 175 | 1 |
| HFC-1225ye | PAG 488 | 1,2-butylene oxide | 2 | yes | 175 | 2 |
| HFC-1225ye | PAG 488 | 1,2-butylene oxide | 2 | no | 175 | 1 |
| HFC-1225ye | PAG 488 | diisopropylamine | 2 | yes | 175 | 2 |
| HFC-1225ye | PAG 488 | diisopropylamine | 2 | no | 175 | 1 |
| HFC-1225ye | PAG 488 | nitromethane | 2 | yes | 175 | 2 |
| HFC-1225ye | PAG 488 | nitromethane | 2 | no | 175 | 1 |
| HFC-1225ye | PAG 488 | tris(trimethylsilyl)silane | 2 | yes | 175 | 2 |
| HFC-1225ye | PAG 488 | tris(trimethylsilyl)silane | 2 | no | 175 | 1 |
| HFC-1225ye | PAG 488 | tocopherol | 2 | yes | 175 | 2 |
| HFC-1225ye | PAG 488 | tocopherol | 2 | no | 175 | 1 |
| HFC-1225ye | PAG 488 | hydroquinone | 2 | yes | 175 | 2 |
| HFC-1225ye | PAG 488 | hydroquinone | 2 | no | 175 | 1 |
| HFC-1225ye | PAG 488 | Butylated hydroxy toluene (BHT) | 2 | yes | 175 | 2 |
| HFC-1225ye | PAG 488 | Butylated hydroxy toluene (BHT) | 2 | no | 175 | 1 |
| HFC-1225ye | PAG 488 | Divinyl terephthalic acid | 2 | yes | 175 | 2 |
| HFC-1225ye | PAG 488 | Divinyl terephthalic acid | 2 | no | 175 | 1 |
| HFC-1225ye | PAG 488 | Tinuvin ® 622LD | 2 | yes | 175 | 2 |
| HFC-1225ye | PAG 488 | Tinuvin ® 622LD | 2 | no | 175 | 1 |
| HFC-1225ye | PAG 488 | $Mn(Cl)_2$ with KCl | 2 | yes | 175 | 2 |
| HFC-1225ye | PAG 488 | $Mn(Cl)_2$ with KCl | 2 | no | 175 | 1 |
| HFC-1225ye | PAG 488 | $TiO_2$ | 2 | yes | 175 | 2 |
| HFC-1225ye | PAG 488 | $TiO_2$ | 2 | no | 175 | 1 |
| HFC-1225ye | PAG 488 | $Na_2CO_3$ | 2 | yes | 175 | 2 |
| HFC-1225ye | PAG 488 | $Na_2CO_3$ | 2 | no | 175 | 1 |
| HFC-1225ye | PAG 488 | 2-hydroxy-4-methoxybenzophenone | 2 | yes | 175 | 2 |
| HFC-1225ye | PAG 488 | 2-hydroxy-4-methoxybenzophenone | 2 | no | 175 | 1 |
| HFC-1225ye | PAG 488 | 2-hydroxybenzophenone | 2 | yes | 175 | 2 |
| HFC-1225ye | PAG 488 | 2-hydroxybenzophenone | 2 | no | 175 | 1 |
| HFC-1225ye | PAG 488 | 2,4-dihydroxybenzophenone | 2 | yes | 175 | 2 |
| HFC-1225ye | PAG 488 | 2,4-dihydroxybenzophenone | 2 | no | 175 | 1 |
| HFC-1225ye | PAG 488 | 2,4-dimethylbenzophenone | 2 | yes | 175 | 2 |
| HFC-1225ye | PAG 488 | 2,4-dimethylbenzophenone | 2 | no | 175 | 1 |
| HFC-1225ye | PAG 488 | 3,4-diaminobenzophenone | 2 | yes | 175 | 2 |
| HFC-1225ye | PAG 488 | 3,4-diaminobenzophenone | 2 | no | 175 | 1 |
| HFC-1225ye | PAG 488 | HP-136 | 2 | yes | 175 | 2 |
| HFC-1225ye | PAG 488 | HP-136 | 2 | no | 175 | 1 |

Estimates indicate improved chemical stability in the presence of stabilizers with and without air present.

What is claimed is:

1. A composition comprising at least one fluoroolefin and an effective amount of a stabilizer comprising:
   a. at least one compound selected from the group consisting of epoxides and fluorinated epoxides represented by Formula A, wherein each of $R^2$ through $R^5$ is H, alkyl of 1 to 6 carbon atoms or fluoroalkyl of 1 to 6 carbon atoms with the proviso that at least one of $R^2$ through $R^5$ is a fluoroalkyl group;

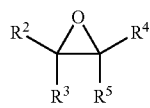

Formula A and
   b. at least one amine selected from the group consisting of triethylamine; tributylamine; diisopropylamine; triisopropylamine; triisobutylamine; p-phenylenediamine; diphenylamine; N-(1-methylethyl)-2-propylamine; alkyl-substituted piperidine, piperidine, piperazinone, alkoxy-substituted piperidine; 2,2,6,6-tetramethyl-4-piperidone; 2,2,6,6-tetramethyl-4-piperidinol; bis-(1,2,2,6,6-pentamethylpiperidyl)sebacate; di-(2,2,6,6-tetramethyl-4-piperidyl)sebacate; poly-(N-hydroxyethyl-2,2,6,6-tetramethyl-4-hydroxy-piperidyl succinate; 2,2,6,6-tetramethyl-4-piperidone, 2,2,6,6-tetramethyl-4-piperidinol, bis-(1,2,2,6,6-pentamethylpiperidyl) sebacate, di-(2,2,6,6-tetramethyl-4-piperidyl)sebacate, poly-(N-hydroxyethyl-2,2,6,6-tetramethyl-4-hydroxy-piperidyl succinate, and mixtures thereof.

2. The composition of claim 1 further comprising at least one refrigerant selected from the group consisting of fluoroolefins, hydrofluorocarbons, hydrocarbons, dimethyl ether, $CF_3I$, carbon dioxide, ammonia and mixtures thereof.

3. The composition of claim 1 further comprising a lubricant selected from the groups consisting of mineral oils, alkylbenzenes, polyalphaolefins, silicone oils, polyoxyalkylene glycol ethers, polyol esters, polyvinylethers and mixtures thereof.

4. The composition of claim 1 further comprising at least one additional stabilizer compound selected from the group consisting of phenols, phosphites, terpenes, terpenoids, and mixtures thereof.

5. The composition of claim 4 wherein:
   a. the phenols are selected from the group consisting of 2,6-di-tert-butyl-4-methylphenol; 2,6-di-tert-butyl-4-ethylphenol; 2,4-dimethyl-6-tert-butylphenol; tocopherol; hydroquinone; t-butyl hydroquinone; 4,4'-thio-bis(2-methyl-6-tert-butylphenol); 4,4'-thiobis(3-methyl-6-tertbutylphenol); 2,2'-thiobis(4-methyl-6-tert-butylphenol); 4,4'-methylenebis(2,6-di-tert-butylphenol); 4,4'-bis(2,6-di-tert-butylphenol); 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methyleenbis(4-methyl-6-nonylphenol); 2,2'-isobutylidenebis(4,6-dimethylphenol; 2,2'-methylenebis(4-methyl-6-cyclohexylphenol, 2,2'-methylenebis(4-ethyl-6-tert-butylphenol); butylated hydroxyl toluene (BHT); 2,6-di-tert-alpha-dimethylamino-p-cresol; 4,4-thiobis(6-tert-butyl-m-cresol; acylaminophenols; 2,6-di-tert-butyl-4(N,N'-dimethylaminomethylphenol); bis(3-methyl-4-hydroxy-5-tert-butylbenzyl)sulfide; bis(3,5-di-tert-butyl-4-hydroxybenzyl)sulfide and mixtures thereof;

b. the phosphites are selected from the group consisting of tris-(di-tert-butylphenyl) phosphite, di-n-octyl phosphite, iso-decyl diphenyl phosphite, and mixtures thereof;

c. the terpenes are selected from the group consisting of isoprene, myrcene, allo-cimene, beta-ocimene, terebene, d-limonene, retinal, pinene, menthol, geraniol, farnesol, phytol, Vitamin A, terpinene, delta-3-carene, terpinolene, phellandrene, fenchene, dipentene, lycopene, betacarotene, zeaxanthin, hepaxanthin, isotretinoin, and mixtures thereof; and d. the terpenoids are selected from the group consisting of abietane, ambrosane, aristolane, atisane, beyerane, bisabolane, bornane, caryophyllane, cedrane, dammarane, drimane, eremophilane, eudesmane, fenchane, gammacerane, germacrane, gibbane, grayanotoxane, guaiane, himachalane, hopane, humulane, kaurane, labdane, lanostane, lupane, p-menthane, oleanane, ophiobolane, picrasane, pimarane, pinane, podocarpane, protostane, rosane, taxane, thujane, trichothecane, ursane; and mixtures thereof.

6. The composition of claim 1 wherein the epoxide or fluorinated epoxide is selected from the group consisting of 1,2-propylene oxide, 1,2-butylene oxide, butylphenylglycidy ether, pentylphenylglycidyl ether, hexylphenylglycidyl ether, heptylphenylglycidyl ether, octylphenylglycidyl ether, nonylphenylglycidyl ether, decylphenylglycidyl ether, glycidyl methylphenylether, 1,4-glycidyl phenyl diether, 4-methoxyphenylglycidyl ether, naphthyl glycidyl ether, 1,4-diglycidyl naphthyl diether, butylphenyl glycidyl ether, n-butyl glycidyl ether, isobutyl glycidyl ether, hexanediol diglycidyl ether, allyl glycidyl ether, polypropylene glycol diglycidyl ether, trifluoromethyloxirane, 1,1-bis(trifluoromethyl)oxirane, and mixtures thereof.

7. The composition of claim 1 wherein said fluoroolefin is at least one compound selected from the group consisting of:
(i) fluoroolefins of the formula E- or Z—$R^1CH=CHR^2$, wherein $R^1$ and $R^2$ are, independently, $C_1$ to $C_6$ perfluoroalkyl groups;
(ii) cyclic fluoroolefins of the formula cyclo-$[CX=CY(CZW)_n-]$, wherein X, Y, Z, and W, independently, are H or F, and n is an integer from 2 to 5; and
(iii) fluoroolefins selected from the group consisting of: 1,2,3,3,3-pentafluoro-1-propene ($CHF=CFCF_3$), 1,1,3,3,3-pentafluoro-1-propene ($CF_2=CHCF_3$), 1,1,2,3,3-pentafluoro-1-propene ($CF_2=CFCHF_2$), 1,2,3,3-tetrafluoro-1-propene ($CHF=CFCHF_2$), 2,3,3,3-tetrafluoro-1-propene ($CH_2=CFCF_3$), 1,3,3,3-tetrafluoro-1-propene $CHF=CHCF_3$), 1,1,2,3-tetrafluoro-1-propene ($CF_2=CFCH_2F$), 1,1,3,3-tetrafluoro-1-propene ($CF_2=CHCHF_2$), 1,2,3,3-tetrafluoro-1-propene ($CHF=CFCHF_2$), 3,3,3-trifluoro-1-propene ($CH_2=CHCF_3$), 2,3,3-trifluoro-1-propene ($CHF_2CF=CH_2$); 1,1,2-trifluoro-1-propene ($CH_3CF=CF_2$); 1,2,3-trifluoro-1-propene ($CH_2FCF=CF_2$); 1,1,3-trifluoro-1-propene ($CH_2FCH=CF_2$); 1,3,3-trifluoro-1-propene ($CHF_2CH=CHF$); 1,1,1,2,3,4,4,4-octafluoro-2-butene ($CF_3CF=CFCF_3$); 1,1,2,3,3,4,4,4-octafluoro-1-butene ($CF_3CF_2CF=CF_2$); 1,1,1,2,4,4,4-heptafluoro-2-butene ($CF_3CF=CHCF_3$); 1,2,3,3,4,4,4-heptafluoro-1-butene ($CHF=CFCF_2CF_3$); 1,1,1,2,3,4,4-heptafluoro-2-butene ($CHF_2CF=CFCF_3$); 1,3,3,3-tetrafluoro-2-(trifluoromethyl)-1-propene (($CF_3)_2C=CHF$); 1,1,3,3,4,4,4-heptafluoro-1-butene ($CF_2=CHCF_2CF_3$); 1,1,2,3,4,4,4-heptafluoro-1-butene ($CF_2=CFCHFCF_3$); 1,1,2,3,3,4,4-heptafluoro-1-butene ($CF_2=CFCF_2CHF_2$); 2,3,3,4,4,4-hexafluoro-1-butene ($CF_3CF_2CF=CH_2$); 1,3,3,4,4,4-hexafluoro-1-butene ($CHF=CHCF_2CF_3$); 1,2,3,4,4,4-hexafluoro-1-butene ($CHF=CFCHFCF_3$); 1,2,3,3,4,4-hexafluoro-1-butene ($CHF=CFCF_2CHF_2$); 1,1,2,3,4,4-hexafluoro-2-butene ($CHF_2CF=CFCHF_2$); 1,1,1,2,3,4-hexafluoro-2-butene ($CH_2FCF=CFCF_3$); 1,1,1,2,4,4-hexafluoro-2-butene ($CHF_2CH=CFCF_3$); 1,1,1,3,4,4-hexafluoro-2-butene ($CF_3CH=CFCHF_2$); 1,1,2,3,3,4-hexafluoro-1-butene ($CF_2=CFCF_2CH_2F$); 1,1,2,3,4,4-hexafluoro-1-butene ($CF_2=CFCHFCHF_2$); 3,3,3-trifluoro-2-(trifluoromethyl)-1-propene ($CH_2=C(CF_3)_2$); 1,1,1,2,4-pentafluoro-2-butene ($CH_2FCH=CFCF_3$); 1,1,1,3,4-pentafluoro-2-butene ($CF_3CH=CFCH_2F$); 3,3,4,4,4-pentafluoro-1-butene ($CF_3CF_2CH=CH_2$); 1,1,1,4,4-pentafluoro-2-butene ($CHF_2CH=CHCF_3$); 1,1,1,2,3-pentafluoro-2-butene ($CH_3CF=CFCF_3$); 2,3,3,4,4-pentafluoro-1-butene ($CH_2=CFCF_2CHF_2$); 1,1,2,4,4-pentafluoro-2-butene ($CHF_2CF=CHCHF_2$); 1,1,2,3,3-pentafluoro-1-butene ($CH_3CF_2CF=CF_2$); 1,1,2,3,4-pentafluoro-2-butene ($CH_2FCF=CFCHF_2$); 1,1,3,3,3-pentafluoro-2-methyl-1-propene ($CF_2=C(CF_3)(CH_3)$); 2-(difluoromethyl)-3,3,3-trifluoro-1-propene ($CH_2=C(CHF_2)(CF_3)$); 2,3,4,4,4-pentafluoro-1-butene ($CH_2=CFCHFCF_3$); 1,2,4,4,4-pentafluoro-1-butene ($CHF=CFCH_2CF_3$); 1,3,4,4,4-pentafluoro-1-butene ($CHF=CHCHFCF_3$); 1,3,3,4,4-pentafluoro-1-butene ($CHF=CHCF_2CHF_2$); 1,2,3,4,4-pentafluoro-1-butene ($CHF=CFCHFCHF_2$); 3,3,4,4-tetrafluoro-1-butene ($CH_2=CHCF_2CHF_2$); 1,1-difluoro-2-(difluoromethyl)-1-propene ($CF_2=C(CHF_2)(CH_3)$); 1,3,3,3-tetrafluoro-2-methyl-1-propene ($CHF=C(CF_3)(CH_3)$); 3,3-difluoro-2-(difluoromethyl)-1-propene ($CH_2=C(CHF_2)_2$); 1,1,1,2-tetrafluoro-2-butene ($CF_3CF=CHCH_3$); 1,1,1,3-tetrafluoro-2-butene ($CH_3CF=CHCF_3$); 1,1,1,2,3,4,4,5,5,5-decafluoro-2-pentene ($CF_3CF=CFCF_2CF_3$); 1,1,2,3,3,4,4,5,5,5-decafluoro-1-pentene ($CF_2=CFCF_2CF_2CF_3$); 1,1,1,4,4,4-hexafluoro-2-(trifluoromethyl)-2-butene (($CF_3)_2C=CHCF_3$); 1,1,1,2,4,4,5,5,5-nonafluoro-2-pentene ($CF_3CF=CHCF_2CF_3$); 1,1,1,3,4,4,5,5,5-nonafluoro-2-pentene ($CF_3CH=CFCF_2CF_3$); 1,2,3,3,4,4,5,5,5-nonafluoro-1-pentene ($CHF=CFCF_2CF_2CF_3$); 1,1,3,3,4,4,5,5,5-nonafluoro-1-pentene ($CF_2$=$CHCF_2CF_2CF_3$); 1,1,2,3,3,4,4,5,5-nonafluoro-1-pentene ($CF_2$=$CFCF_2CF_2CHF_2$); 1,1,2,3,4,4,5,5,5-nonafluoro-2-pentene ($CHF_2CF$=$CFCF_2CF_3$); 1,1,1,2,3,4,4,5,5-nonafluoro-2-pentene ($CF_3CF$=$CFCF_2CHF_2$); 1,1,1,2,3,4,5,5,5-nonafluoro-2-pentene ($CF_3CF$=$CFCHFCF_3$); 1,2,3,4,4-hexafluoro-3-(trifluoromethyl)-1-butene ($CHF$=$CFCF(CF_3)_2$); 1,1,2,4,4,4-hexafluoro-3-(trifluoromethyl)-1-butene ($CF_2$=$CFCH(CF_3)_2$); 1,1,1,4,4,4-hexafluoro-2-(trifluoromethyl)-2-butene ($CF_3CH$=$C(CF_3)_2$); 1,1,3,4,4,4-hexafluoro-3-(trifluoromethyl)-1-butene ($CF_2$=$CHCF(CF_3)_2$); 2,3,3,4,4,5,5,5-octafluoro-1-pentene ($CH_2$=$CFCF_2CF_2CF_3$); 1,2,3,3,4,4,5,5-octafluoro-1-pentene ($CHF$=$CFCF_2CF_2CHF_2$); 3,3,4,4,4-pentafluoro-2-(trifluoromethyl)-1-butene ($CH_2$=$C(CF_3)CF_2CF_3$); 1,1,4,4,4-pentafluoro-3-(trifluoromethyl)-1-butene ($CF_2$=$CHCH(CF_3)_2$); 1,3,4,4,4-pentafluoro-3-(trifluoromethyl)-1-butene ($CHF$=$CHCF(CF_3)_2$); 1,1,4,4,4-pentafluoro-2-(trifluoromethyl)-1-butene ($CF_2$=$C(CF_3)CH_2CF_3$); 3,4,4,4-tetrafluoro-3-(trifluoromethyl)-1-butene (($CF_3)_2$CFCH=$CH_2$); 3,3,4,4,5,5,5-heptafluoro-1-pentene ($CF_3CF_2CF_2CH$=$CH_2$); 2,3,3,4,4,5,5-heptafluoro-1-pentene ($CH_2$=$CFCF_2CF_2CHF_2$); 1,1,3,3,5,5,5-heptafluoro-1-butene ($CF_2$=$CHCF_2CH_2CF_3$); 1,1,1,2,4,4,4-heptafluoro-3-methyl-2-butene ($CF_3CF$=$C(CF_3)(CH_3)$); 2,4,4,4-tetrafluoro-3-(trifluoromethyl)-1-butene ($CH_2$=$CFCH(CF_3)_2$); 1,4,4,4-tetrafluoro-3-(trifluoromethyl)-1-butene ($CHF$=$CHCH(CF_3)_2$); 1,1,1,4-tetrafluoro-2-(trifluoromethyl)-2-butene ($CH_2FCH$=$C(CF_3)_2$); 1,1,1,3-tetrafluoro-2-(trifluoromethyl)-2-butene ($CH_3CF$=$C(CF_3)_2$); 1,1,1-trifluoro-2-(trifluoromethyl)-2-butene (($CF_3)_2C$=$CHCH_3$); 3,4,4,5,5,5-hexafluoro-2-pentene ($CF_3CF_2CF$=$CHCH_3$); 1,1,1,4,4,4-hexafluoro-2-methyl-2-butene ($CF_3C(CH_3)$=$CHCF_3$); 3,3,4,5,5,5-hexafluoro-1-pentene ($CH_2$=$CHCF_2CHFCF_3$); 4,4,4-trifluoro-2-(trifluoromethyl)-1-butene ($CH_2$=$C(CF_3)CH_2CF_3$); 1,1,2,3,3,4,4,5,5,6,6,6-dodecafluoro-1-hexene ($CF_3(CF_2)_3CF$=$CF_2$); 1,1,1,2,2,3,4,5,5,6,6,6-dodecafluoro-3-hexene ($CF_3CF_2CF$=$CFCF_2CF_3$); 1,1,1,4,4,4-hexafluoro-2,3-bis(trifluoromethyl)-2-butene (($CF_3)_2$ C=$C(CF_3)_2$); 1,1,1,2,3,4,5,5,5-nonafluoro-4-(trifluoromethyl)-2-pentene (($CF_3)_2$CFCF=$CFCF_3$); 1,1,1,4,4,5,5,5-octafluoro-2-(trifluoromethyl)-2-pentene (($CF_3)_2$C=$CHC_2F_5$); 1,1,1,3,4,5,5,5-octafluoro-4-(trifluoromethyl)-2-pentene (($CF_3)_2$CFCF=$CHCF_3$); 3,3,4,4,5,5,6,6,6-nonafluoro-1-hexene ($CF_3CF_2CF_2CF_2CH$=$CH_2$); 4,4,4-trifluoro-3,3-bis(trifluoromethyl)-1-butene ($CH_2$=$CHC(CF_3)_3$); 1,1,1,4,4,4-hexafluoro-3-methyl-2-(trifluoromethyl)-2-butene (($CF_3)_2C$=$C(CH_3)(CF_3)$); 2,3,3,5,5,5-hexafluoro-4-(trifluoromethyl)-1-pentene ($CH_2$=$CFCF_2CH(CF_3)_2$); 1,1,1,2,4,4,5,5,5-nonafluoro-3-methyl-2-pentene ($CF_3CF$=$C(CH_3)CF_2CF_3$); 1,1,1,5,5,5-hexafluoro-4-(trifluoromethyl)-2-pentene ($CF_3CH$=$CHCH(CF_3)_2$); 3,4,4,5,5,6,6,6-octafluoro-2-hexene ($CF_3CF_2CF_2CF$=$CHCH_3$); 3,3,4,4,5,5,6,6-octafluoro1-hexene ($CH_2$=$CHCF_2CF_2CF_2CHF_2$); 1,1,1,4,4-pentafluoro-2-(trifluoromethyl)-2-pentene (($CF_3)_2C$=$CHCF_2CH_3$); 4,5,5,5-pentafluoro-2-(trifluoromethyl)-1-pentene ($CH_2$=$C(CF_3)CH_2C_2F_5$); 3,3,4,4,5,5-heptafluoro-2-methyl-1-pentene ($CF_3CF_2CF_2C(CH_3)$=$CH_2$); 4,4,5,5,6,6,6-heptafluoro-2-hexene ($CF_3CF_2CF_2CH$=$CHCH_3$); 4,4,5,5,6,6,6-heptafluoro-1-hexene ($CH_2$=$CHCH_2CF_2C_2F_5$); 1,1,1,2,2,3,4-heptafluoro-3-hexene ($CF_3CF_2CF$=$CFC_2H_5$); 4,5,5,5-tetrafluoro-4-(trifluoromethyl)-1-pentene ($CH_2$=$CHCH_2CF(CF_3)_2$); 1,1,1,2,5,5,5-heptafluoro-4-methyl-2-pentene ($CF_3CF$=$CHCH(CF_3)(CH_3)$); 1,1,1,3-tetrafluoro-2-(trifluoromethyl)-2-pentene (($CF_3)_2C$=$CFC_2H_5$); 1,1,1,2,3,4,4,5,5,6,6,7,7,7-tetradecafluoro-2-heptene ($CF_3CF$=$CFCF_2CF_2C_2F_5$); 1,1,1,2,2,3,4,5,5,6,6,7,7,7-tetradecafluoro-3-heptene ($CF_3CF_2CF$=$CFCF_2C_2F_5$); 1,1,1,3,4,4,5,5,6,6,7,7,7-tridecafluoro-2-heptene ($CF_3CH$=$CFCF_2CF_2C_2F_5$); 1,1,1,2,4,4,5,5,6,6,7,7,7-tridecafluoro-2-heptene ($CF_3CF$=$CHCF_2CF_2C_2F_5$); 1,1,1,2,2,4,5,5,6,6,7,7,7-tridecafluoro-3-heptene ($CF_3CF_2CH$=$CFCF_2C_2F_5$); and 1,1,1,2,2,3,5,5,6,6,7,7,7-tridecafluoro-3-heptene ($CF_3CF_2CF$=$CHCF_2C_2F_5$).

8. The composition of claim 1 further comprising at least one metal deactivator selected from the group consisting of areoxalyl bis(benzylidene)hydrazide; N,N'-bis(3,5-di-tert-butyl-4-hydroxyhydrocinnamoylhydrazine); 2,2'-oxamido-bis-ethyl-(3,5-d-tert-butyl-4-hydroxyhydorcinnamate); N,N'-(disalicyclidene)-1,2-propanediamine; ethyenediaminetetraacetic acid and salts thereof; triazoles; benzotriazole, 2-mercaptobenzothiazole, tolutriazole derivatives, N,N-disalicylidene-1,2-diaminopropane, and mixtures thereof.

9. A method for stabilizing a composition comprising at least one fluoroolefin, said method comprising adding an effective amount of a stabilizer comprising at least one epoxide or fluorinated epoxide and at least one amine selected from the group consisting of triethylamine; tributylamine; diisopropylamine; triisopropylamine; triisobutylamine; p-phenylenediamine; diphenylamine; N-(1-methylethyl)-2-propylamine; alkyl-substituted piperidine, piperidine, piperazinone, alkoxy-substituted piperidine; 2,2,6,6-tetramethyl-4-piperidone; 2,2,6,6-tetramethyl-4-piperidinol; bis-(1,2,2,6,6-pentamethylpiperidyl)sebacate; di-(2,2,6,6-tetramethyl-4-piperidyl)sebacate; poly-(N-hydroxyethyl-2,2,6,6-tetramethyl-4-hydroxy-piperidyl succinate; 2,2,6,6-tetramethyl-4-piperidone, 2,2,6,6-tetramethyl-4-piperidinol, bis-(1,2,2,6,6-pentamethylpiperidyl)sebacate, di-(2,2,6,6-tetramethyl-4-piperidyl)sebacate, poly-(N-hydroxyethyl-2,2,6,6-tetramethyl-4-hydroxy-piperidyl succinate, and mixtures thereof, to the composition comprising at least one fluoroolefin.

10. A process for producing cooling comprising condensing the composition of claim 1 and thereafter evaporating said composition in the vicinity of a body to be cooled.

11. A process for producing heat comprising condensing the composition of claim 1 in the vicinity of a body to be heated, and thereafter evaporating said composition.

12. A method for reducing degradation of a composition comprising at least one fluoroolefin, wherein said degradation is caused by the presence of inadvertent air in a refrigeration, air-conditioning or heat pump system, said method comprising adding an effective amount of a stabilizer comprising at least one epoxide or fluorinated epoxide and at least one amine selected from the group consisting of triethylamine; tributylamine; diisopropylamine; triisopropylamine; triisobutylamine; p-phenylenediamine; diphenylamine; N-(1-methylethyl)-2-propylamine; alkyl-substituted piperidine, piperidine, piperazinone, alkoxy-substituted piperidine; 2,2,6,6-tetramethyl-4-piperidone; 2,2,6,6-tetramethyl-4-piperidinol; bis-(1,2,2,6,6-pentamethylpiperidyl)sebacate; di-(2,2,6,6-tetramethyl-4-piperidyl)sebacate; poly-(N-hydroxyethyl-2,2,6,6-tetramethyl-4-hydroxy-piperidyl succinate; 2,2,6,6-tetramethyl-4-piperidone, 2,2,6,6-tetramethyl-4-piperidinol, bis-(1,2,2,6,6-pentamethylpiperidyl)sebacate, di-(2,2,6,6-tetramethyl-4-piperidyl)sebacate, poly-(N-hydroxyethyl-2,2,6,6-tetramethyl-4-hydroxy-piperidyl succinate, and mixtures thereof, to the composition comprising at least one fluoroolefin.

13. A method for reducing reaction with oxygen for a composition comprising at least one fluoroolefin, said method comprising adding an effective amount of a stabilizer comprising at least one epoxide or fluorinated epoxide and at least one amine selected from the group consisting of triethylamine; tributylamine; diisopropylamine; triisopropylamine; triisobutylamine; p-phenylenediamine; diphenylamine; N-(1-methylethyl)-2-propylamine; alkyl-substituted piperidine, piperidine, piperazinone, alkoxy-substituted piperidine; 2,2,6,6-tetramethyl-4-piperidone; 2,2,6,6-tetramethyl-4-piperidinol; bis-(1,2,2,6,6-pentamethylpiperidyl)sebacate; di-(2,2,6,6-tetramethyl-4-piperidyl)sebacate; poly-(N-hydroxyethyl-2,2,6,6-tetramethyl-4-hydroxy-piperidyl succinate; 2,2,6,6-tetramethyl-4-piperidone, 2,2,6,6-tetramethyl-4-piperidinol, bis-(1,2,2,6,6-pentamethylpiperidyl)sebacate, di-(2,2,6,6-tetramethyl-4-piperidyl)sebacate, poly-(N-hydroxyethyl-2,2,6,6-tetramethyl-4-hydroxy-piperidyl succinate, and mixtures thereof, to the composition comprising at least one fluoroolefin.

* * * * *

UNITED STATES PATENT AND TRADEMARK OFFICE
CERTIFICATE OF CORRECTION

PATENT NO. : 9,777,204 B2
APPLICATION NO. : 14/817337
DATED : October 3, 2017
INVENTOR(S) : Andrew Edward Feiring et al.

Page 1 of 1

It is certified that error appears in the above-identified patent and that said Letters Patent is hereby corrected as shown below:

In the Claims

Column 32, Line 67, Claim 5, delete "2,4-dimethyl-6-tert-butylphenol;" and insert -- 2,4-dimethyl-6-tertbutylphenol; --.

Column 33, Line 10, Claim 5, delete "methyleenbis" and insert -- methylenebis --.

Column 33, Line 25, Claim 5, delete "allo-cimene," and insert -- allo-ocimene, --.

Column 33, Lines 43-44, Claim 6, delete "butylphenylglycidy" and insert -- butylphenylglycidyl --.

Column 34, Line 1, Claim 7, delete "(propeneCHF=CHCF$_3$)," and insert -- propene (CHF=CHCF$_3$), --.

Column 35, Lines 62-63, Claim 7, delete "octafluorol-hexene" and insert -- octafluoro-1-hexene --.

Column 36, Line 28, Claim 8, delete "(disalicyclidene)" and insert -- (disalicylidene) --.

Signed and Sealed this
Sixteenth Day of October, 2018

Andrei Iancu
*Director of the United States Patent and Trademark Office*